US011223676B1

(12) United States Patent
Ramachandran et al.

(10) Patent No.: US 11,223,676 B1
(45) Date of Patent: Jan. 11, 2022

(54) SCALABLE MULTI-CHANNEL CONTENT DISTRIBUTION AND OPTIMIZATION USING PEER COMPARISON

(71) Applicant: salesforce.com, inc., San Francisco, CA (US)

(72) Inventors: Gautham Ramachandran, Campbell, CA (US); Ana Bertran, San Francisco, CA (US); Zeqiang Wang, Redmond, WA (US); Gerald Gibson, Jr., Federal Way, WA (US); Michael Elizarov, Indianapolis, IN (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/158,465

(22) Filed: Jan. 26, 2021

(51) Int. Cl.
*G06F 15/173* (2006.01)
*H04L 29/08* (2006.01)
*G06F 11/34* (2006.01)
*G06N 7/00* (2006.01)
*G06F 11/30* (2006.01)

(52) U.S. Cl.
CPC ........ *H04L 67/104* (2013.01); *G06F 11/3006* (2013.01); *G06F 11/3452* (2013.01); *G06N 7/005* (2013.01); *H04L 67/22* (2013.01)

(58) Field of Classification Search
CPC .... H04L 67/104; H04L 67/22; G06F 11/3006; G06F 11/3452; G06N 7/005
See application file for complete search history.

(56) References Cited

U.S. PATENT DOCUMENTS

| | | | |
|---|---|---|---|
| 10,785,122 B2 * | 9/2020 | Inamdar | H04L 67/22 |
| 2018/0204217 A1 * | 7/2018 | Bedi | G06Q 10/0635 |
| 2020/0126100 A1 * | 4/2020 | Goyal | G06F 16/285 |

* cited by examiner

*Primary Examiner* — Anh Nguyen
(74) *Attorney, Agent, or Firm* — Holland & Hart LLP

(57) ABSTRACT

A method of data processing includes identifying a segment of entity identifiers that are associated with a target tenant and correspond to a set of clients that are to receive at least one content object via a first channel of a plurality of supported channels. The method includes modifying a feature associated with communication of content for a test subset of the segment relative to a control subset of the segment, determining a first metric corresponding to the control subset and the test subset in association with the communication of the content via the first channel and a second metric associated with the target tenant over a second channel of the plurality of channels. The method includes comparing the second metric to a metric associated with a peer group of tenants, and adjusting subsequent communications for the target based at least in part on the comparing and the first metric.

17 Claims, 12 Drawing Sheets

US 11,223,676 B1

SCALABLE MULTI-CHANNEL CONTENT DISTRIBUTION AND OPTIMIZATION USING PEER COMPARISON

FIELD OF TECHNOLOGY

The present disclosure relates generally to database systems and data processing, and more specifically to scalable multi-channel content distribution and optimization using peer comparison.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some examples, a cloud platform may support content distribution to users via a communication channel. For example, the cloud platform may manage email communications such as to optimize for email content, email timing, email frequencies, etc. In some cases, these optimizations may be based on feedback data associated with prior email communications.

DETAILED DESCRIPTION

Figure 1:
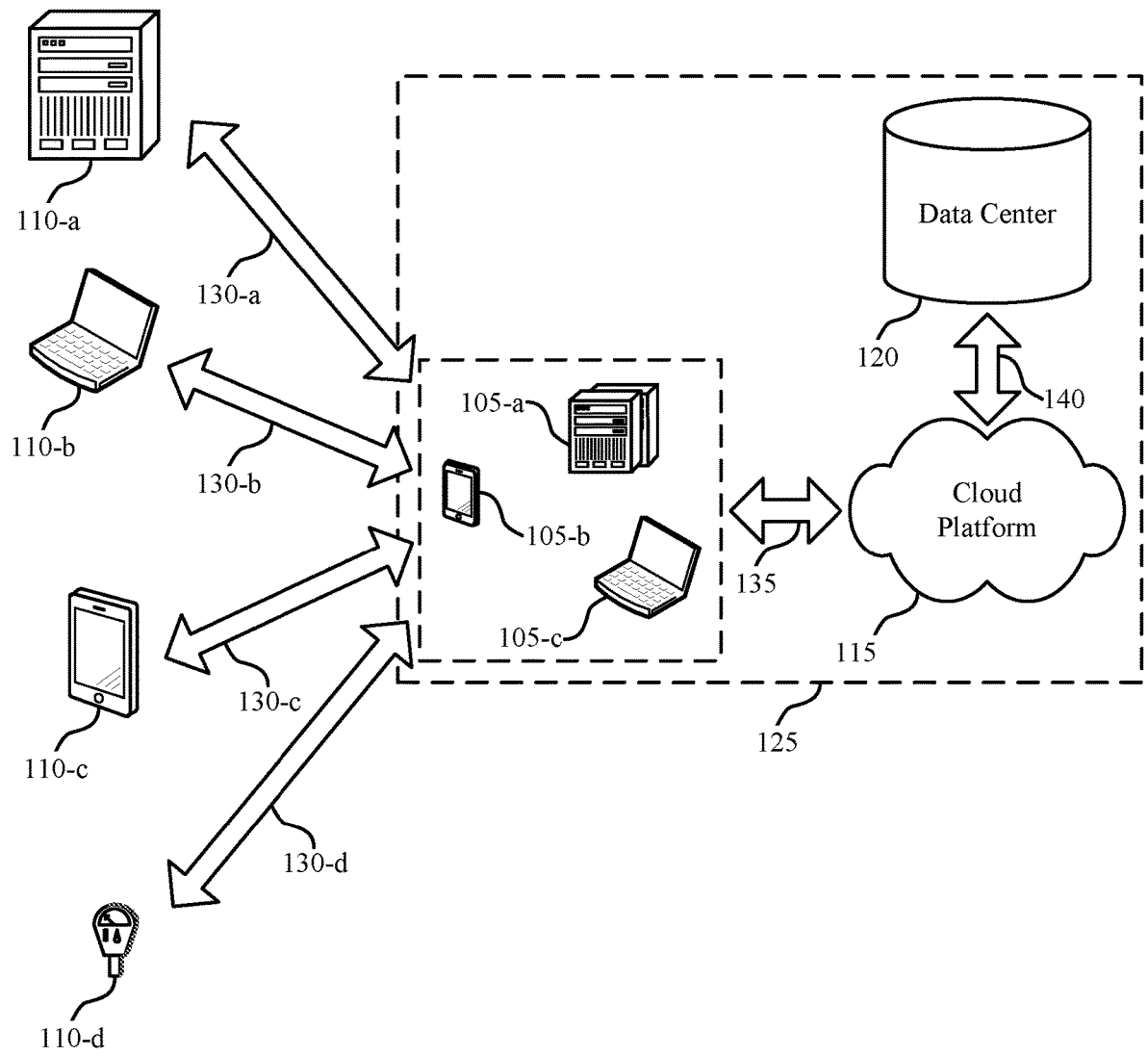
FIG. 1 illustrates an example of a data processing system that supports scalable multi-channel content distribution and optimization using peer comparison in accordance with aspects of the present disclosure.

A content communication system may manage content communication through a content distribution channel, such as email, social media, website marketing channel, etc. In some cases, a content communication system may support identification of improved content, send times, and other features. Typically, these systems are configured for one type of channel, such as email, search, social media, etc. and may identify improvements based on metrics for a particular organization that supports the system. In the case of email, a system may be configured to determine an improved email send time for an organization using feedback metrics (e.g., open rate/click rate) determined by transmitting emails to subscribers over a set of times. Similar techniques may be used for other channels and other variables (e.g., send times, send frequency, content).

Techniques described herein leverage a system that supports multiple content communications channels, such as email, social, web advertising channels, etc. for multiple tenants (organizations) of a multi-tenant system. The multiple channels and multiple tenants provide a rich data set which may be used to support improved content distribution schemes. More particularly, by monitoring the impact of distribution across multiple channels, the system may support cross-channel scheme adjustments. Further, techniques described herein support comparing user behavior data of a target tenant to user behavior data of a peer set of tenants to determine causal impact of content distribution schemes.

For example, when a set of entities (e.g., users) are scheduled to receive some content over a particular channel, the system may segment the set of entities into a test group and control group. The control group may be scheduled to receive the content as scheduled, while the test group is to receive the content with some feature adjustment. The adjustment may relate to a feature such as send time, content (e.g., different image, text, keywords, etc.), the use of another channel in addition to the selected channel, etc. In the case of the use of an additional channel, the system may determine that some subset of the entities is to receive content via a social media post in addition to a scheduled email. The system determines incremental measurements between the control and test group based on the adjustment (e.g., open rate, click rate, etc.) and causal measurements (e.g., volume of posts, purchases, sentiment changes). The system may determine whether the changes in the measured metrics were caused by the feature adjustment by comparing the measurements to a peer group of tenants. In some cases, the system compares the metrics such that the metrics reflect user behavior during the time period in which the content is being distributed. The peer group may be identified based on industry, commercial activity, or other data that is accessible by the system. Thus, by measuring incremental measurement change, causal change, and comparing these metrics to peers, the system may identify whether the adjustment was related to the changes in metrics (or due to some other external factor) and adjust distribution of content accordingly.

The system supports a Bayesian causal interference model for determining the impact of the feature adjustments. The model may be used to determine whether a measured metric is statistically significant. In some examples, the metrics that the system monitors include data associated with the peer tenants and the target tenants and the data may correspond to volume of posts related to the peer or target tenant, volume of interaction with peer and target posts, semantic analysis, website purchases, or a combination of these. Further, the system may support segment identification and division (into test and control subsets) such that the test and control subsets are proportional in features, such as geographic location, in order to account for external factors that may impact user behavior data.

Aspects of the disclosure are initially described in the context of an environment supporting an on-demand database service. Aspects of the disclosure are further described with respect to a system that supports multiple communication channels and multiple tenants, a process for implementing the features of content distribution and peer comparison, and a process flow diagram illustrating data flow and operations for content distribution and peer comparison. Aspects of the disclosure are further illustrated by and described with reference to apparatus diagrams, system diagrams, and flowcharts that relate to scalable multi-channel content distribution and optimization using peer comparison.

FIG. 1 illustrates an example of a system 100 for cloud computing that supports scalable multi-channel content distribution and optimization using peer comparison in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may support a content communication system that may support distribution of content via multiple channels and multiple tenants (e.g., multiple cloud clients 105). For example, a tenant may access the content communication system of the cloud platform 115 to plan, schedule, monitor, and adjust distribution of digital content (e.g., marketing content) to users or entities (e.g., contacts 110) via one or more channels, monitor user behavior data (e.g., feedback data corresponding to interactions 130) associated with the content distribution, and adjust distribution based on the feedback. For example, a marketing manager may access the content communication system to segment users based on attribute data and schedule a targeted email campaign for the users. After distribution, the system may monitor the engagement metrics (e.g., open rate, click rate) to determine and implement adjustments. Systems may be similarly accessed for scheduling and monitoring content distribution via social media channels, advertising channels (e.g., web marketing), search engine marketing, etc.

Some marketing systems may support optimization for content, send times, and other features. Typically, these systems are configured for one type of channel, such as email, search, social media, etc. and may optimize based on metrics for a particular organization that supports the system. In the case of email, a system may be configured to determine an optimal email send time for an organization using feedback metrics (e.g., open rate/click rate) determined by transmitting emails to subscribers over a set of times. Similar techniques may be used for other channels and other variables (e.g., send times, send frequency, content). However, these systems may utilize siloed data, meaning that the data that is used to determine the optimizations corresponds to the data for the channel on which the content is distributed and to a particular organization or firm. These systems may not account for external factors that may impact changes in user behavior and the data corresponding to such behavior. As such, the adjustments taken by such systems may not be based on a complete data set. Accordingly, these systems may be associated with significant resource overhead, since the systems may use incomplete data to determine and adjust transmission schemes.

Techniques described herein leverage data from multiple channels as well as multiple tenants to support improved content distribution schemes. The content communication system supported by the data platform 115 may support planning, monitoring, and feedback for content distribution via multiple channels and for multiple tenants (e.g., cloud clients 105) and uses a machine learning model to support measured and inferred impacts of various distribution schemes. Thus, by distributing content via one or more channels, monitoring user behavior data associated with one or more other channels, and comparing metrics identified based on the behavior data to similar metrics for other tenants, the system may support determining whether some feature adjustment for content distribution was directly or indirectly related to some measured difference in performance metrics. The system may further make subsequent distribution adjustments based on these measurements and comparisons. Thus, these techniques may improve content distribution efficiency and reliability, while reducing resource overhead associated with distribution of content in an inefficient manner based on incomplete data.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
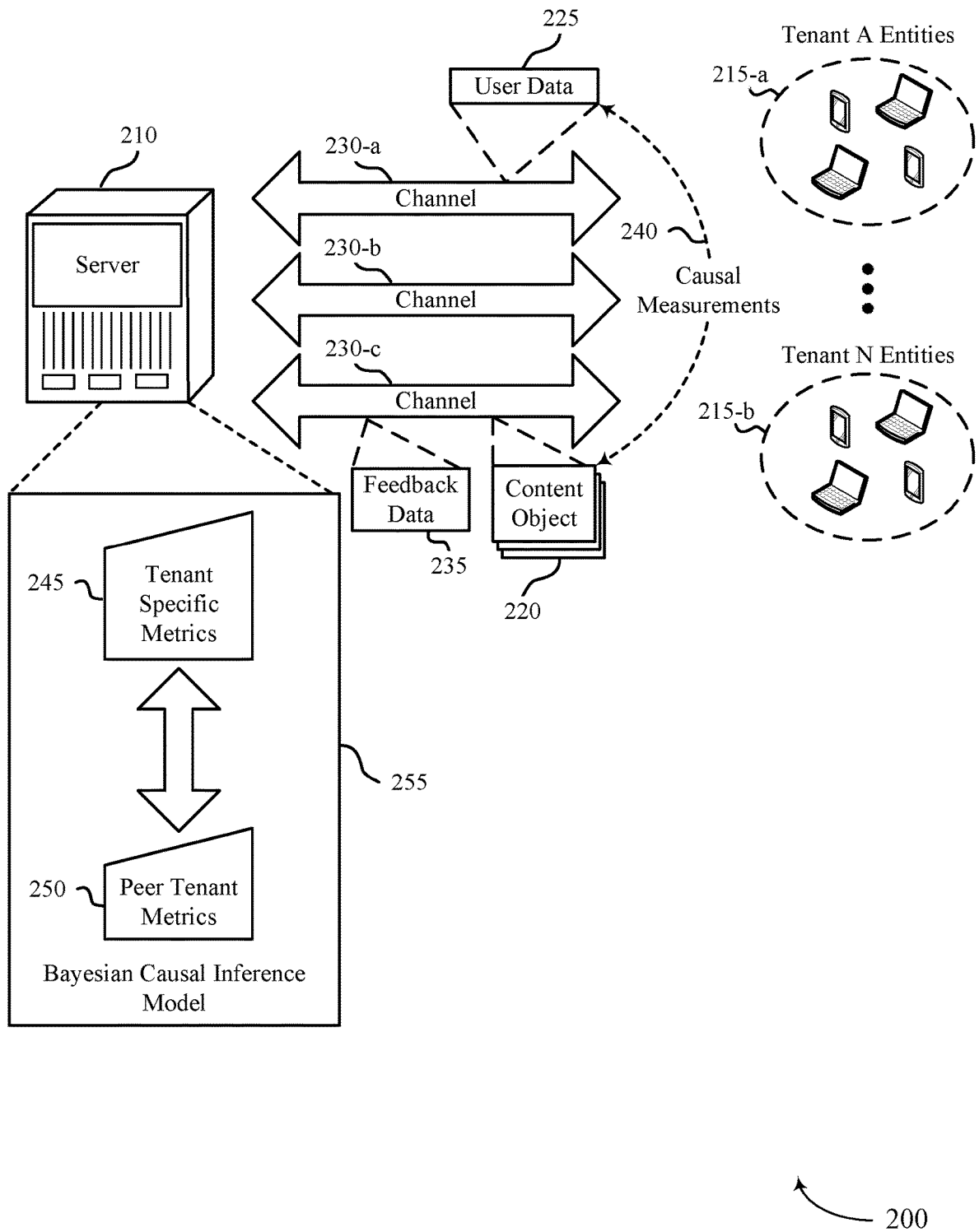
FIG. 2 illustrates an example of a system that supports scalable multi-channel content distribution and optimization using peer comparison in accordance with aspects of the present disclosure.

FIG. 2 illustrates an example of a system 200 that supports scalable multi-channel content distribution and optimization using peer comparison in accordance with aspects of the present disclosure. The system 200 includes a server 210, which may be an example of aspects of could platform 115 or data center 120 of FIG. 1 and may represent one or more physical or logical computing systems. For example, the server 210 may represent aspects of a data processing system, a content distribution or communication system, and other related computing entities. The server 210 may support a plurality of tenants (e.g., cloud clients 105 of FIG. 1) in content distribution, data monitoring in association with the content distribution, and content distribution adjustment, as described herein.

The server 210 may support a content communication system that manages content distribution over a plurality of channels 230. Each channel 230 may be associated with a content communication type, such as email, social media, search (e.g., web search), push messaging, or other type of client communication platform. For example, channel 230-a may correspond to a social media channel, which represents various social media platforms and various services that are associated with those platforms. Similarly, channel 230-c may correspond to an email channel and may represent multiple email service providers and associated services. Channel 230-b may represent a search engine marketing channel and associated services. As such, each channel 230 may represent multiple platforms or systems corresponding to the type of channel. For example, the social media channel 230-a may represent multiple different social media platforms. It should be understood that these channels are for illustrative purposes, and other types of content communication channels are contemplated within the scope of the present disclosure.

The channels 230 and associated services represent various systems and techniques for distribution of content, monitoring user behavior data associated with the distribution of content, as well as monitoring other user behavior data. For example, the channel 230-c, which may be an example of an email channel, may support distribution of content to a set of users via email and monitoring user feedback data 235 associated with the distributed emails. The feedback data 235 may indicate whether a particular user opened an email, clicked a link or content object within the email, deleted the email, unsubscribed to an email list, etc. Similarly, the social media channel 230-a may support distribution of social media posts, updates, streams, etc. associated with a particular tenant via various social media platforms. The social media channel 230-a may also support monitoring user behavior data associated with tenants over the social media platform. For example, the user behavior data may include whether users are viewing the posts, interacting with the posts (e.g., favoriting, liking, disliking, commenting, reposting) as well as whether users are discussing a tenant, mentioning a tenant, tagging a tenant, etc. In some examples, these channels 230 may support receiving user behavior data for a set of identified users as well as user behavior data irrespective of whether the users are known contacts (e.g., contacts 110 of FIG. 1) associated with a tenant.

For each channel 230-a, different types of content may be distributed and different types of user data 225 and/or feedback data 235 may be monitored and ingested. For the email channel 230-c, the server 210 may determine various metrics, such as open rate, click rate, click to open rate, unsubscribe rate, delete rate, etc. for a set of distributed content objects, emails, etc. For the social media channel 230-a, the server 210 may determine metrics such as impressions (corresponding to posts, replies, streams), as well as semantic analysis, which indicates whether various users are mentioning or discussing a tenant and whether the discussion is positive or negative. As described above, these metrics may be determined for a set of known users or entities (e.g., entities that receive some targeted content, such as an email or social media post associated with a target tenant) or unknown users. In the case of unknown users, the system may determine metrics, such as sentiment analysis, for a tenant during a period of time. As described further herein, the period of time may be associated with a period during which content is distributed via the channel 230 in which the metric is identified, or some other channel 230.

The server 210 may also access or support user behavior data 225 associated with the ecommerce platform for the tenants. For example, a tenant may offer items or services for purchase via a tenant specific retailer (e.g., a physical retail location or an online retailer) or via a third party retailer. The server 210 may access user behavior data such as online web browsing data, purchase data (e.g., via the online retailer or physical store), and similar data. Various metrics may be determined based on this user behavior, such as purchase rate, view rate, return rate, etc. Thus, a channel 230-*b* may also be associated with the retail systems supported or used by the tenants. As described herein, these metrics may be associated with a set of known entities or users or associated with the tenant without reference to a set of particular users.

In some cases, the server 210 or an associated server may support an entity segmentation service. An entity segmentation service may maintain a datastore of entities (which may correspond to various users, such as contacts 110 of FIG. 1) and associated attributes in a data model for each tenant. Attributes may correspond to various characteristics, such as purchase history, web-behavior data, user characteristics (e.g., name, address, email address, age, gender, geographic location), among other attributes. Further, each entity or entity identifier may be associated with a one or more clients, such as a service or platform that may be used to receive content. For example, an entity associated with a particular user may be associated with an email address that corresponds to an email client that the user accesses to receive email, a social media account (e.g., a social media client the user uses to access the social media platform), a web browser account, etc. The customer data platform of the server 210 may monitor and augment the data model based on data corresponding to user behavior. A user, such as a marketing manager, may access the entity segmentation service to generate a segment of entities to receive some content (e.g., marketing content), such as content objects 220, via one or more channels. The content may be configured for a particular set of users or subscribers having similar attributes. Thus, the user or marketing manager may use the entity segmentation service to identify attributes such that a segment of entities may be identified for receipt of the content item in a targeted manner.

Aspects of the disclosure herein described techniques to support leveraging data associated with the multiple channels 230 and multiple tenants to support improved content distribution schemes. For example, a marketing manager of tenant A (e.g., a target tenant) may use the services to identify a segment of their entities 215-*a*, which may be examples of subscribers, customers, prospective customers, etc. that are identified according to the techniques described herein. The segment of entities may be scheduled to receive one or more content objects 220 via email over the email channel 230-*c*, where the content objects 220 may be associated with the target tenant, meaning that the content identifies the target tenant, references the target tenant, or the like. Instead of sending the email to the users using "normal" features, one or more features may be adjusted for a subset of the segment, and the feedback data 235 corresponding to the email channel 230-*c* and user data 225 associated with one or more other channels 230 may be used to determine the impact of the adjustment to the features.

Features that may be adjusted may include a content payload of an email, post, advertisement, push message, etc. For example, two different images may be tested for impact by sending the images via email to different subsets of the segment of entities. Other content payload adjustments may include subject or title, copy, colors or color combinations, keywords, etc. Other feature adjustments may be send time, send frequency, channel combinations, etc. In the case of channel combinations, one subset of the segment of entities may receive an email, while the other subset of entities may receive an email in combination with a social media post.

Thus, after the segment of entities is identified and a baseline schedule or content distribution scheme is determined, a feature adjustment may be identified for testing (e.g., AB testing). In some cases, the feature modification may be selected by the user (e.g., marketing manager) or may be automatically determined. The segment of entities may be divided into two (or more) proportional subsets, including control subset and a test subset, by the server 210. The server may identify the proportional groups based on attributes associated with the entities of the segment. For example, the server 210 may identify the subsets based on geographical location, age, etc., such that the impact of the feature adjustment is more accurately determined (e.g., other potential impacts are limited).

The server 210 may also support a peer tenant identification service. The peer tenants may be identified, as further described herein, in order to determine an inferred impact of the distributed content and/or the feature adjustment. The server 210 may identify the peer group of tenants from the other tenants supported by the server 210. The peer group of tenants may be identified based on information associated with the target tenant and information associated with the tenants supported by the server 210. Such information may include the target tenant name (e.g., company name), industry, company size, revenue, etc. The server 210 may use pattern matching or other techniques to identify the peer group of tenants. For example, tenant B may be identified as a peer of tenant A based on having similar attributes. Additionally or alternatively, the peer group may be identified based on similar historical behavioral patterns for a metric or statistical measure that is to be used for the analysis as described herein. For example, a user may select the metric, such as open or click rate for emails for a target tenant, and the peer tenant identification service may identify the peer tenants that have similar (e.g., within a configured threshold or within a configured statistical measure) open or click rates for a prior time period. The time period may be predefined, dynamic, or selected by the user. In some examples, an average or other measure for the metric may be determined for the target tenant and compared to peer tenants to determine the peer tenants to be used for analysis. For example, peer tenants may be identified based on the tenants that are within some threshold of the tenant measure, or the closest n tenants may be selected (e.g., based on the closest measurements to the target tenant measurement). Other examples of peer tenant identification are contemplated within the scope of the present disclosure.

The server 210 may transmit the content object to the clients associated with the entities (e.g., devices associated with the entities 215-*a*) according to the determined schedule. Further, the content objects 220 may be distributed to the control subset according to the schedule and to the test subset according to the feature adjustment. The server 210 may also monitor the feedback data 235 associated with the distribution channel as well as user data 225 over other channels 230. The feedback data 235 and the user data 225 may be monitored before, during, and/or after the content is distributed in order to determine changes in the behavior data.

The data may be interpreted by the server 210 to determine various metrics. For example, for the feedback data 235 corresponding to email channel 230-*c* in which the content objects 220 are distributed, in this example, is interpreted to determine metrics such as open rate, click rate, click to open rate, delete rate and/or unsubscribe rate. As such, the channel 230-*c* may support services and systems that indicate when a receiving entity performs an action regarding the content object 220 or email, such as open, click, delete, unsubscribe. In some examples, the open rate, click rate, etc. may be referred to incremental measurements, meaning that the metrics may be directly identified and compared between the test and control subset to determine real or tangible differences in the subsets. The user data 225 associated with other channels may also be interpreted to determine metrics. For example, impression data for social media channel 230-*a* may be interpreted to determine various metrics. The user data 225 may correspond to users that actually received the email (e.g., users of the segment) but have performed one or more actions in the other channel or to other general users interacting via the other channels 230. These metrics that are not directly related to the distribution of the content may be referred to as causal metrics.

The test group of entities and the control group of entities may be compared to determine whether the metrics are different enough (e.g., exceed some configured statistical measure). That is, the metrics may be compared to determine whether there is statistically significant difference between the metric associated with the test subset and the control subset. Additionally, the server 210 may identify a change in metrics corresponding to the tenant in a different channel 230 (e.g., tenant specific metrics 245). For example, the server 210 may identify an increase in social media interaction or discussion associated with the target tenant, an increase in website/retail purchases associated with the target tenant, increase in searches associated with the tenant, etc. This change in metric may be due to the distributed content objects 220 or may be due to some other factor. In some cases these causal metrics for the target tenant are directly related to the entities that received the content via the other channel. For example, the system may monitor the behavioral data associated with the segment of entities in a social channel (where the segment received the content via email). Additionally or alternatively, the causal metrics for the target tenant are not directly related to the entities that received the content via the other channels. That is, the causal metrics may be an overall metric for users that interact with the target tenant via the other channels without reference to the particular entities that received the content via the content distribution channel for a particular scheme.

In order to determine whether the change in metrics in the other channel(s) 230 are due to the content distribution via the first channel 230, as illustrated by arrow 240 illustrating an impact, the server 210 may compare these metrics associated with the tenant in the other channels 230 (e.g., tenant specific metrics 245) to the metrics associated with the identified peer tenants in the other channels 230 (e.g., peer tenant metrics 250). If the data indicates that the peer tenants saw a similar increase in activity (e.g., a similar change in peer tenant metrics 250), then the server 210 may assume that the change in tenant specific metrics 245 was not due to the distribution of the content objects 220, but due to some other external cause, factor, or behavior. However, if the data indicates that the peer tenant metrics 250 did not similarly change, then the server 210 may assume that the change in metrics are associated with the distributed content objects 220. The server 210 may implement a Bayesian causal inference model 255 to support the metric comparisons and to determine whether the changes or differences in metrics are statistically significant. The model may be configured for volume based inference and rate based inference for multi-channel improvement.

After the server determines the impacts (e.g., incremental changes and causal changes), the server 210 may adjust subsequent content distribution. For example, if it is determined that the adjusted feature positively impacted the metrics (e.g., increase in click rate or open rate, increase in purchases, increase in positive sentiment), then the server 210 may allocate additional resources (e.g., budget, processing resources) such that more users/entities/clients receive the content object 220 with the feature adjustment. It should be understood that these techniques are implemented using a feedback loop such that these adjustments are dynamically, periodically, and/or continuously performed. As such, a segment of entities (including the test and control subsets) may be scheduled over a period of time such that the entities scheduled to receive the content object in the later portions of the period receive the content with the adjustments based on measured metrics in the earlier portions of the period. As more information is received and as more content is distributed in accordance with the distribution schedule, the metrics may be updated, further comparisons may be performed, and additional adjustments may be implemented.

Further, the server 210 may support more than one feature adjustment simultaneously or contemporaneously. In such cases, the segment of entities may be divided into multiple test subsets such that each test subset corresponds to a feature adjustment. As such, each test subset may be compared to the control subset based on incremental and/or causal metrics to determine the impact of the adjustments. As additional user behavior data is collected, multiple feature adjustments may be combined to determine impacts of these combinations on the distribution of content.

As the techniques described herein are implemented in a multi-tenant system, the server 210 may support data anonymity between tenants. More particularly, the user may not be aware which tenants are identified as the peer group of tenants. Additionally, the user data 225 associated with other tenants may not be used or accessible by the target tenant.

By using peer metric comparisons as described herein, the system may be able to identify whether some measured or inferred metric change was related to a content distribution scheme adopted by a target tenant. For example, the target tenant may identify an increase in some performance related to a distribution scheme. However, in order to determine that the performance increase was due to the adopted scheme, the system described herein supports comparing metrics between tenants. Thus, if the target tenant and the peer tenants were associated with similar increase or changes in metrics in various channels, then the system may assume that the distribution scheme for the target tenant may not be related to the increase in performance in other channels. If, however, the target tenant and the peer tenants were not associated with similar increases or changes in metrics, then the system may assume that the distribution scheme for the target tenant impactite these changes and adjust subsequent communications accordingly.

Figure 3:
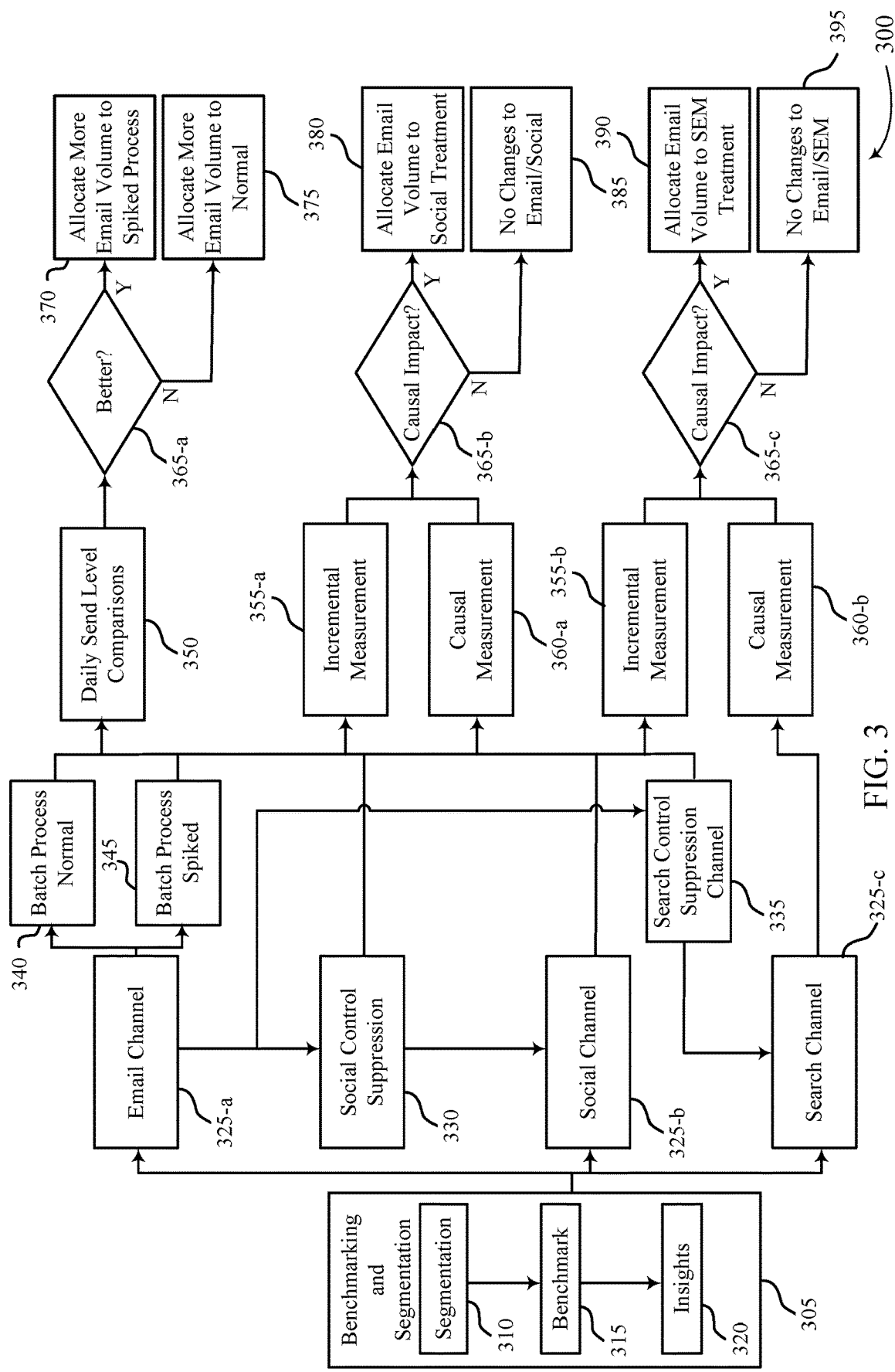
FIG. 3 illustrates an example of a process that supports scalable multi-channel content distribution and optimization using peer comparison in accordance with aspects of the present disclosure.

FIG. 3 illustrates an example of a process 300 that supports scalable multi-channel content distribution and optimization using peer comparison in accordance with aspects of the present disclosure. The process 300 may be implemented by a server 210, as described with respect to FIG. 2, and/or aspects of a cloud platform 115 as described with respect to FIG. 1. The process 300 is an example process for improving email distribution using email performance as a baseline to improve social campaigns and/or search engine campaigns using causal and incremental measurements. The process may use channels 325, which may be examples of the channels 230 as described with respect to FIG. 2.

A benchmarking and segmentation system 305 may represent various aspects and services described herein. Various features of the benchmarking and segmentation system 305 may be performed by one or more physical and/or logical computing systems. For example, a segmentation component 310 may support a segmentation service for identifying a segment of entities corresponding to a data model of a tenant and based on the attribute data in the data model. Further, the segmentation component 310 may identify test and control subsets of the segment for testing various feature adjustments for content distribution. As described herein, there may be multiple feature adjustments to test, and as such, the segment may be divided such that the control subset and corresponding data may be compared to the various test subsets corresponding to the feature adjustments to be tested.

A benchmarking component 315 may monitor data, such as feedback data 235 and user data 225 of FIG. 2 to determine metrics and compare metrics to peer tenants to determine whether changes in data are statistically significant. The benchmarking component 315 may identify the peer group of tenants for peer comparison. An insight component 320 may use the metrics determined by the benchmarking component 315 to identify improvements for content distribution, such as time of day, day of week, etc. across various dimensions, such as state or country.

In the illustrated example, an email distribution platform or service of the system described herein may be used to create a batch of emails to be transmitted to a segment of entities. The segmentation component 310 or the email platform corresponding to email channel 325-*a* may generate two batches of emails that are to be transmitted to respective subsets of the segment (e.g., the test and control subset). For example, one batch of emails (e.g., batch process spiked at 345) with a feature adjustment, such as transmit time (e.g., time of day, day of week), message size, etc. are to be transmitted to the test subset of entities, and another batch (e.g., batch process normal at 340) is to be transmitted using another known or normal setting. The two batches may be transmitted by the email platform and the performance is measured for the two batches based on an open rate, click rate, or a combination of these. The performance of each batch may be compared at daily send level comparisons 350. Further, the performances of the two populations corresponding to the two subsets of entities may be compared across other channels, such as social media channel 325-*b* and search engine channel 325-*c*. For example, it may be determined whether the two populations are associated with increased interaction on the social media channel 325-*b* or increased searching on the search engine channel 325-*c*. This information may be determined based on the system being able to associate the users across the channels.

The system may also compare the metrics associated with the other channels 325 to peer metrics for the other channels 325. For example, if the open rate for the spiked or modified batch is increased in the email channel 325-*a* and the engagement rate for the spiked batch is increased in the social media channel 325-*b*, the system may determine whether data associated with peer tenants in the social media channel 325-*b* indicates similar increased engagement. That is, the percentile increase in engagement may be assessed relative to the peer tenants. Based on these comparisons, the system may allocate more email volume to the spiked process at 370 or to the normal process at 375. Thus, this example may determine whether adjustments within a channel may improve rates within the channel and/or outside the channel.

Similarly, cross channel adjustments may be measured for improvement. For example, instated of or in addition to adjusting the email send time, frequency, or content, as described in the preceding example, the system may allocate some social media posts to the users of the test segment (e.g., the spiked batch) such that those users receive an email and a social media post, while the control group does not receive the social media post (but does receive the email). As described herein, the incremental comparisons of the group may be performed to determine whether a statistically significant change occurred between the test subset and the control subset. For example, the system may determine the incremental measurements at 355-*a* between the control group and the test group in the email channel (e.g., open rate, click rate) that reflect whether the social media posts impacted the incremental email metrics. Similarly, various causal metrics may be identified (e.g., at 360-*a*), such as volume of posts related to the target tenant, positive sentiment measurement related to the target tenant in the social channel, increased website purchases related to the target tenant on a retail channel, etc. In the case of positive increase in the metrics as determined at 365-*b*, the system may allocate more email volume to social treatment at 380, or in the case of no change or negative impact, the system may make no changes to email or social at 385. In some cases, these metrics in other channels may be determined for the entities that received the email in the email channel 325-*a*. For example, the accounts in the other channels that correspond to the segment of entities in the email channels may be monitored to determine behavioral data and metrics.

Further, similar metrics may also be identified for the peer tenants. The causal metrics for the peer tenants and the causal metrics for the target tenant may be compared to determine whether some other external factor caused a change in the metrics associated with the social channel 330. Thus, the volume of posts, sentiment measures, purchase volumes, etc. may be determined for the peer tenants and compared to those metrics for the target tenant. The system may perform the adjustments at 380 or 385 based on these comparisons. These techniques may be similarly extended to the search engine channel 325-*c*. Thus, at 365-*b*, depending on the scenario, the system may determine whether social channels improve email metrics or whether emails increase causal impacts on social media. Similarly, at 365-*c*, the system may determine whether search engine marketing improves email metrics or whether email increases the causal impacts on search engine marketing. Based on the determining at 364-*c*, the system may allocate email volume for search engine marketing treatment at 390 or make no changes to the email and search engine marketing volume at 395.

These techniques may also be used in other cross-channel scenarios, such as between social media channels 325-*b* and search engine marketing channels 325-*c*. Further, the incremental measurements may be performed in another channel besides search. For example, the system may determine metrics associated with a social media post/advertisement, such as impressions (e.g., likes, clicks, replies/comments, shares) based on a test subset (e.g., receiving a modified feature) and a control subset.

Thus, using these techniques, the system supports the ability to benchmark and percentile a tenant's multi-channel content distribution performance and identify improvements based on peer tenant performance. Further, the system supports the ability to measure and simultaneously improve marketing performance across multiple channels. For the email channel 325-*a*, the system may determine improvements based on time of the day, day of week, content, etc. For the social media channel 325-b, the system may determine whether social media enhances performance in other channels. For the search channel 325-c, the system may determine non-branded search engine marketing enhances performance in other channels. Further, the system may reassess various metrics based on a peer set of tenants comparison and allocate volume for subsequent communications accordingly.

Social control suppression at 330 and the search control suppression at 335 may support testing methodology, such as AB testing. For example, the social control suppression at 330 may select a random group of entities for receiving some treatment (e.g., change in content, format, copy, etc.) and another group receives another treatment, such as a normal or known feature. More particularly, two versions of a single variable (e.g., of a content object) may be tested in the social channel. Similar techniques may be performed at search control suppression at 345 for the search channel 325-c. If one version of the variable is associated with more feedback or interaction (e.g., in a positive sense), then more volume may be allocated to the particular treatment at 380 or at 390.

Figure 4:
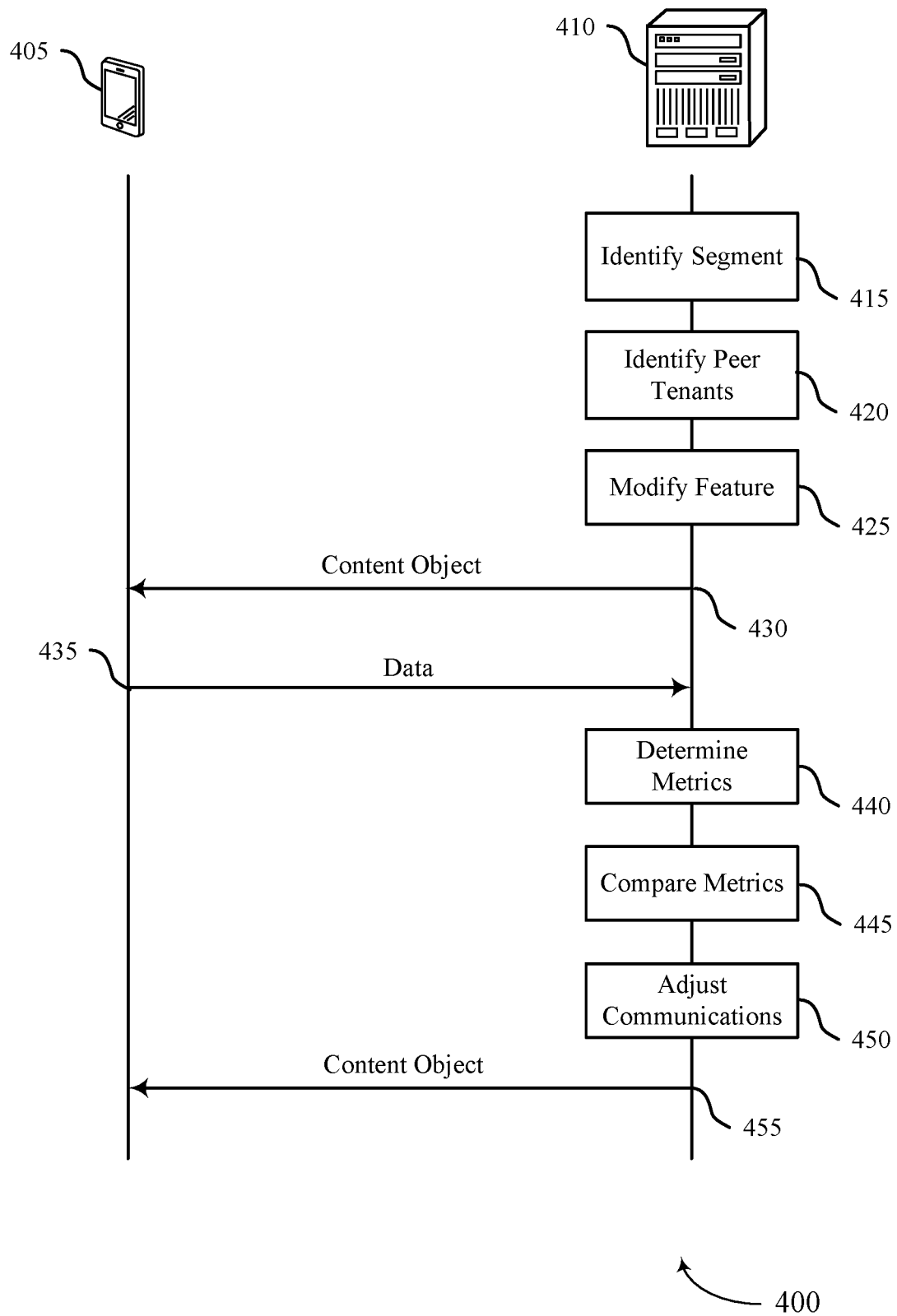
FIG. 4 illustrates an example of a process flow diagram that illustrates scalable multi-channel content distribution and optimization using peer comparison in accordance with aspects of the present disclosure.

FIG. 4 illustrates an example of a process flow diagram 400 that illustrates scalable multi-channel content distribution and optimization using peer comparison in accordance with aspects of the present disclosure. The process flow diagram 400 includes a user device 405 and a server 410, which may be an example of the server 210 as described with respect to FIG. 2. The server 410 may be an example of or may be configured to support a content communication system as described herein.

At 415, the server 410 may identify a segment of entity identifiers that are associated with a target tenant and correspond to a set of clients that are to receive at least one content object via a first content communication channel supported by the content communication system. The content communication system may support a plurality of tenants for communication of content objects via a plurality of content communication channels. The segment may be identified based on receiving a list of entity identifiers from another service or system or may be identified by the content communication system. In some examples, the segment may be identified based on selection of one or more attributes by a user to define the segment. The segment may be identified based on similar or overlapping attributes as defined in a data model associated with the target tenant.

At 420, the server 410 may identify a peer group of tenants from the plurality of tenants supported by the content communication system. The peer group of tenants may be identified based on information associated with the target tenant, such as name, industry, size, etc.

At 425, the server 410 may modify a feature associated with communication of the at least one content object for a test subset of the segment relative to a control subset of the segment. For example, the server 410 may modify a distribution time or frequency, distribution scheme, content, keywords. In some examples, the test subset may be scheduled to receive content over at least one additional communication channel of the plurality of channels supported by the content communication system. In some examples, the server 410 may modify the features based on selection of the feature and the modification parameters by a user. The control subset may be scheduled to receive the content object using a standard distribution scheme, which may be a scheme that is used in prior communications. In some examples, the test and control subset may be identified such that the entities are proportionally distributed between the test and control subsets based on various attributes, such as geographic location.

At 430, the server 410 may distribute the content object to one or more user devices 405 associated with the test subset and the control subset according to the modification. In some examples, the content objects are distributed to a subset of the test and control subset such that any feedback data may be used for determining adjustments for subsequent communications to the remaining entities of the test and control subsets.

At 435, the server 410 may receive data associated with communication of the content object communication over the first communication channel. This data may correspond to user interaction data with the distributed content objects and may be referred to as incremental data. The server 410 may also receive data associated with the tenant over other communication channels as well as data associated with peer tenants over other communication channels. The data associated with the other communication channels may correspond to causal data. The data may be received or determined based on monitoring user behavior data on the various channels. The data received or captured may be based on a selection of a data type and/metric by a user. That is, as a user is configuring the distribution scheme, the user may select the metrics to use for baselining and peer comparison.

At 440, the server 410 may determine a first metric corresponding to the control subset and the test subset in association with the communication of the at least one content object via the first content communication channel and a second metric associated with the target tenant over a second content communication channel of the plurality of content communication channels. The first metric may be based on user feedback data and may indicate the user interaction with the content relative to the distribution of the content. For example, for an email channel, the first metric may be open rate, click rate, etc. For a social channel, the first metric may correspond to impressions. For a search engine or other advertising channel (e.g., video advertising on video feeds), the metrics may be click rates, view rates, or the like. The second metric may be a causal metric and may correspond to social media engagement, posts, sentiment, website purchases, etc. that may not be directly related to the distributed content. As described herein, the metrics may be determined based on a user selection.

At 445, the server 410 may compare the second metric to a metric associated with a peer group of tenants of the plurality of tenants. For example, if the second metric associated with the tenant is social media sentiment, interaction, website purchases, etc., the system may identify similar metrics corresponding to the peer group of tenants. The comparison may determine that the first difference between the first metric corresponding to the test subset and the first metric corresponding to the control subset is greater than a first statistical measure. The comparison may determine that a second difference between the second metric associated with the target tenant over the second content communication channel and the metric associated with the peer group of tenants is greater than a second statistical measure. The statistical measures may correspond to statistically significant differences. For example, the statistical measure (e.g., the first statistical measure) for open rate may correspond to a statistical difference in open rate between the test subset and control subset at a 95% confidence level. The second difference may correspond to a significant change in the second metric, such as a significant increase in the volume of social media posts during the pre and the post period (e.g., pre-testing period and post-testing period) when compared to the variance in past data of the social posts.

At 450, the server 410 may adjust subsequent communications for the target tenant based at least in part on the comparing and the first metric. For example, if the first metric is statistically different between the test and control subset, and the second metric is statistically different between the target tenant and the peer group of tenants, then the server 410 may determine to adjust subsequent communications such that more resources are allocated to the feature adjustment corresponding to the test subset of entities.

Figure 5:
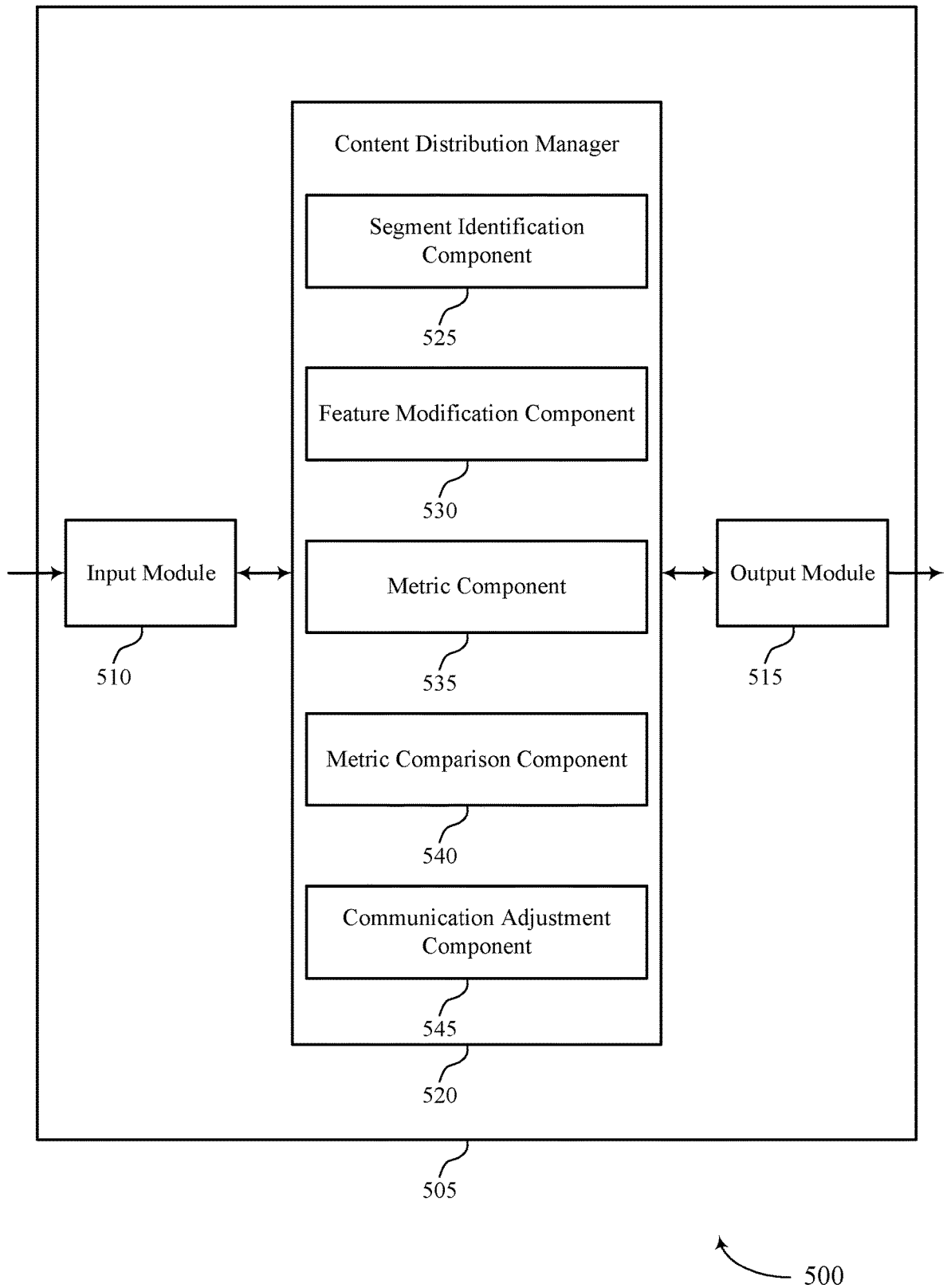
FIG. 5 shows a block diagram of an apparatus that supports scalable multi-channel content distribution and optimization using peer comparison in accordance with aspects of the present disclosure.

FIG. 5 shows a block diagram 500 of a device 505 (e.g., apparatus) that supports scalable multi-channel content distribution and optimization using peer comparison in accordance with aspects of the present disclosure. The device 505 may include an input module 510, an output module 515, and a content distribution manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the content distribution manager 520 to support scalable multi-channel content distribution and optimization using peer comparison. In some cases, the input module 510 may be a component of an I/O controller 710 as described with reference to FIG. 7.

The output module 515 may manage output signals for the device 505. For example, the output module 515 may receive signals from other components of the device 505, such as the content distribution manager 520, and may transmit these signals to other components or devices. In some specific examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the content distribution manager 520 may include a segment identification component 525, a feature modification component 530, a metric component 535, a metric comparison component 540, a communication adjustment component 545, or any combination thereof. In some examples, the content distribution manager 520, or various components thereof, may be configured to perform various operations (e.g., receiving, monitoring, transmitting) using or otherwise in cooperation with the input module 510, the output module 515, or both. For example, the content distribution manager 520 may receive information from the input module 510, send information to the output module 515, or be integrated in combination with the input module 510, the output module 515, or both to receive information, transmit information, or perform various other operations as described herein.

The content distribution manager 520 may support data processing in accordance with examples as disclosed herein. The segment identification component 525 may be configured as or otherwise support a means for identifying, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels. The feature modification component 530 may be configured as or otherwise support a means for modifying a feature associated with communication of the at least one content object for a test subset of the segment relative to a control subset of the segment. The metric component 535 may be configured as or otherwise support a means for determining a first metric corresponding to the control subset and the test subset in association with the communication of the at least one content object via the first content communication channel and a second metric associated with the target tenant over a second content communication channel of the plurality of content communication channels. The metric comparison component 540 may be configured as or otherwise support a means for comparing the second metric to a metric associated with a peer group of tenants of the plurality of tenants. The communication adjustment component 545 may be configured as or otherwise support a means for adjusting subsequent communications for the target tenant based at least in part on the comparing and the first metric.

Figure 6:
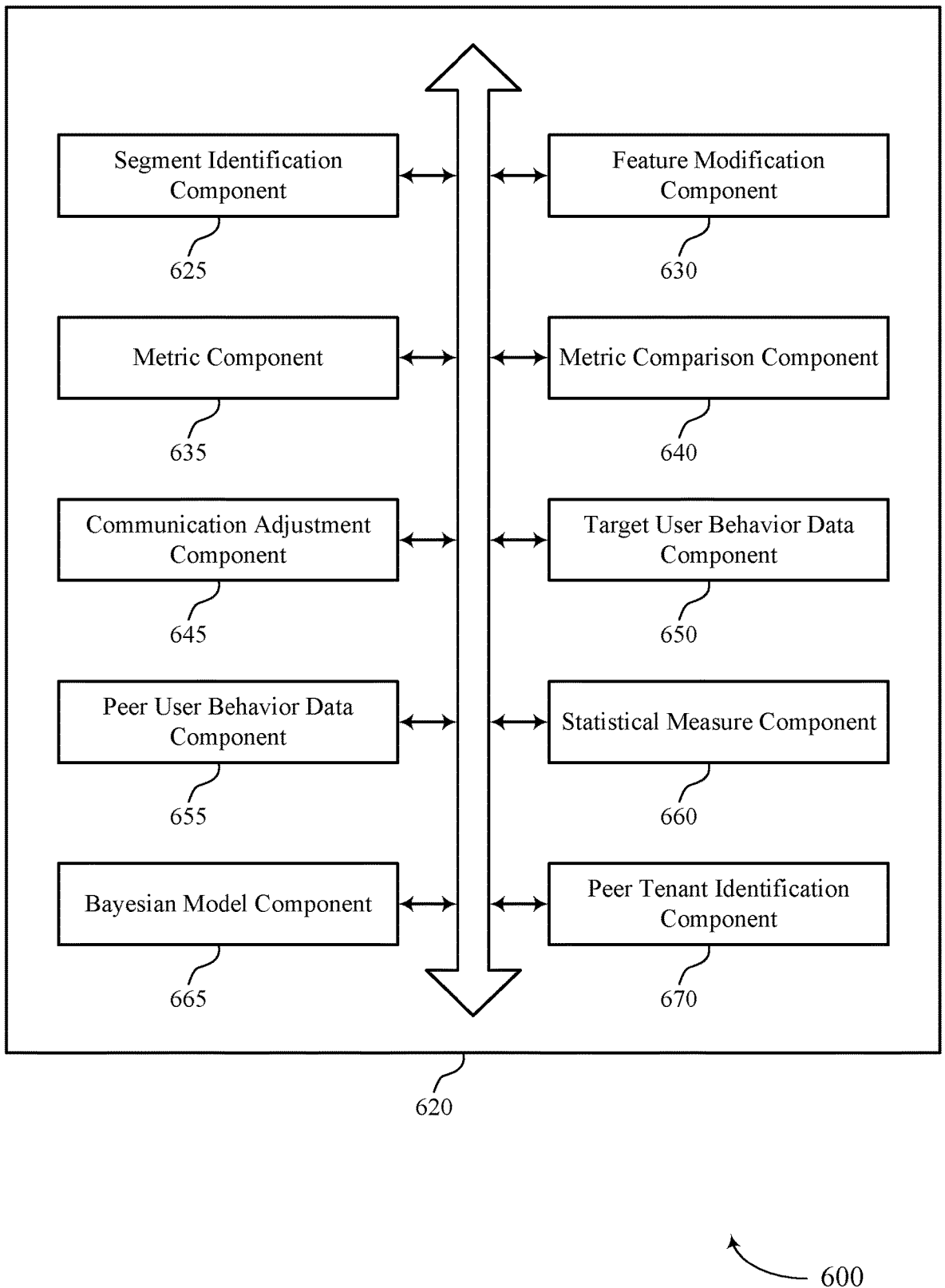
FIG. 6 shows a block diagram of a content distribution manager that supports scalable multi-channel content distribution and optimization using peer comparison in accordance with aspects of the present disclosure.

FIG. 6 shows a block diagram 600 of a content distribution manager 620 that supports scalable multi-channel content distribution and optimization using peer comparison in accordance with aspects of the present disclosure. The content distribution manager 620 may be an example of aspects of a content distribution manager or a content distribution manager 520, or both, as described herein. The content distribution manager 620, or various components thereof, may be an example of means for performing various aspects of scalable multi-channel content distribution and optimization using peer comparison as described herein. For example, the content distribution manager 620 may include a segment identification component 625, a feature modification component 630, a metric component 635, a metric comparison component 640, a communication adjustment component 645, a target user behavior data component 650, a peer user behavior data component 655, a statistical measure component 660, a Bayesian model component 665, a peer tenant identification component 670, or any combination thereof. Each of these components may communicate, directly or indirectly, with one another (e.g., via one or more buses).

The content distribution manager 620 may support data processing in accordance with examples as disclosed herein. The segment identification component 625 may be configured as or otherwise support a means for identifying, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels. The feature modification component 630 may be configured as or otherwise support a means for modifying a feature associated with communication of the at least one content object for a test subset of the segment relative to a control subset of the segment. The metric component 635 may be configured as or otherwise support a means for determining a first metric corresponding to the control subset and the test subset in association with the communication of the at least one content object via the first content communication channel and a second metric associated with the target tenant over a second content communication channel of the plurality of content communication channels. The metric comparison component 640 may be configured as or otherwise support a means for comparing the second metric to a metric associated with a peer group of tenants of the plurality of tenants. The communication adjustment component 645 may be configured as or otherwise support a means for adjusting subsequent communications for the target tenant based at least in part on the comparing and the first metric.

In some examples, the target user behavior data component 650 may be configured as or otherwise support a means for monitoring user behavior associated with the target tenant via the second content communication channel to determine the second metric. In some examples, the peer user behavior data component 655 may be configured as or otherwise support a means for monitoring user behavior associated with each tenant of the peer group of tenants via the second content communication channel to determine the metric associated with the peer group of tenants.

In some examples, the second metric and the metric associated with the peer group of tenants correspond to a volume of posts, a volume of interaction, a positive semantic analysis, a negative semantic analysis, a volume of website purchases or a combination thereof.

In some examples, the peer user behavior data component 655 may be configured as or otherwise support a means for monitoring, for each peer tenant of the peer group of tenants, the second content communication channel during a time period associated with communication of the at least one content object. In some examples, the metric component 635 may be configured as or otherwise support a means for determining the metric associated with the peer group of tenants based at least in part on monitoring the second content communication channel during the time period.

In some examples, the statistical measure component 660 may be configured as or otherwise support a means for determining that a first difference between the first metric corresponding to the test subset and the first metric correspond to the control subset is greater than a first statistical measure. In some examples, the statistical measure component 660 may be configured as or otherwise support a means for determining that a second difference between the second metric associated with the target tenant over the second content communication channel and the metric associated with the peer group of tenants is greater than a second statistical difference based at least in part on the comparing, wherein the subsequent communications are adjusted based at least in part on the first difference being greater than the first statistical measure and the second difference being greater than the second statistical measure.

In some examples, to support determining the second metric, the Bayesian model component 665 may be configured as or otherwise support a means for implementing a Bayesian causal interference model to determine that the second metric is associated with the modified feature.

In some examples, the peer tenant identification component 670 may be configured as or otherwise support a means for identifying the peer group of tenants based at least in part on a name associated with the target tenant, an industry associated with the target tenant, a company size associated with the target tenant, or a combination thereof.

In some examples, the segment identification component 625 may be configured as or otherwise support a means for dividing the segment of entity identifiers into the test subset and the control subset based at least in part on geographical locations associated with one or more entity identifiers of the segment of entity identifiers.

In some examples, to support modifying the feature, the communication adjustment component 645 may be configured as or otherwise support a means for implementing a communication over the second content communication channel that corresponds to the communication of the at least one content object over the first content communication channel, wherein the first metric indicates an impact of the communication over the second content communication channel on feedback for communication of the at least one content object over the first communication channel.

In some examples, to support modifying the feature, the feature modification component 630 may be configured as or otherwise support a means for modifying a communication time, a communication schedule, a communication frequency, or a content payload.

In some examples, each content communication channel is associated with a different platform type of a social media platform, an email platform, a search engine platform, or a video marketing platform.

Figure 7:
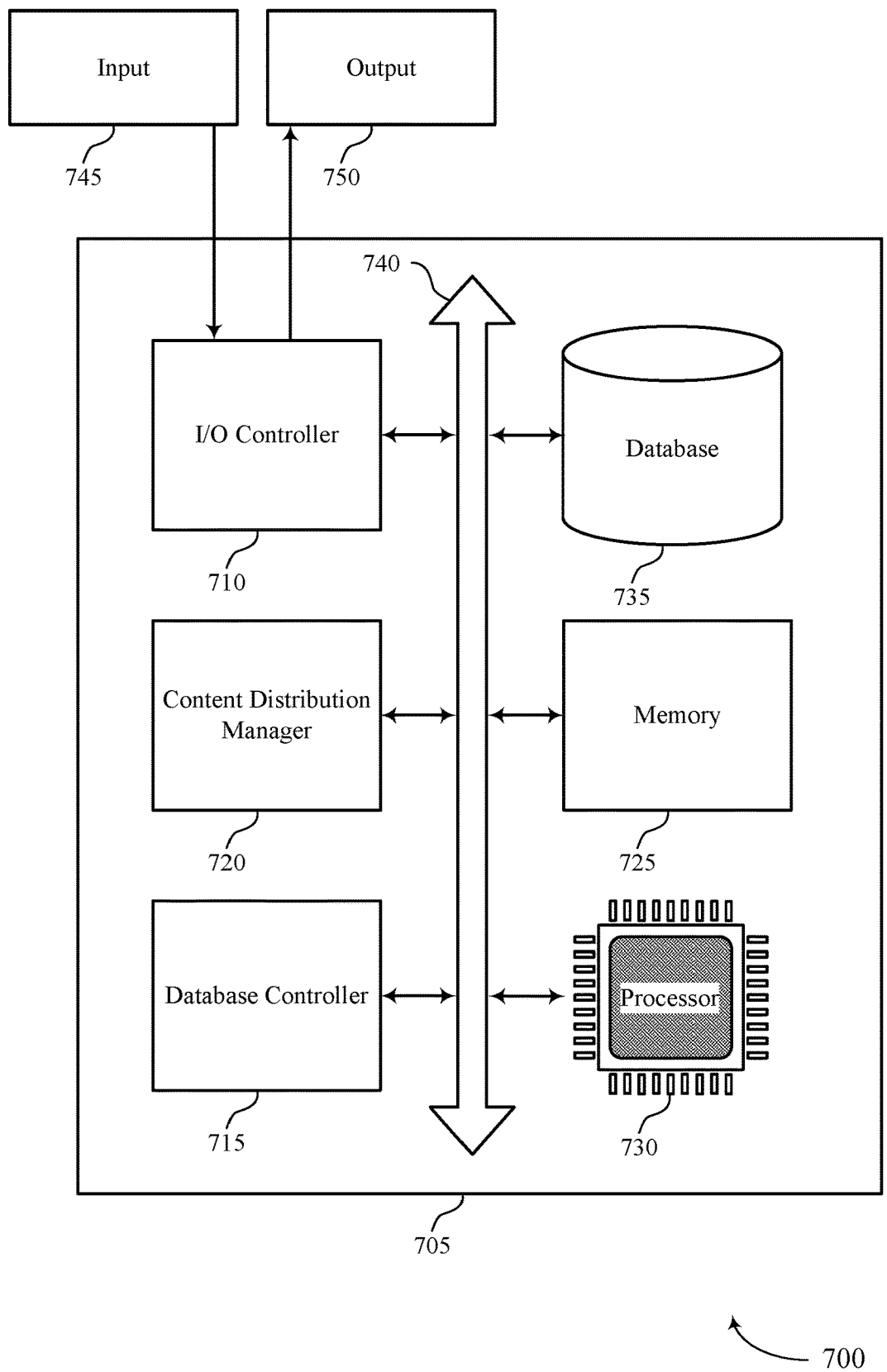
FIG. 7 shows a diagram of a system including a device that supports scalable multi-channel content distribution and optimization using peer comparison in accordance with aspects of the present disclosure.

FIG. 7 shows a diagram of a system 700 including a device 705 that supports scalable multi-channel content distribution and optimization using peer comparison in accordance with aspects of the present disclosure. The device 705 may be an example of or include the components of a device 505 as described herein. The device 705 may include components for data analysis and communication, such as a content distribution manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor. In some cases, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting scalable multi-channel content distribution and optimization using peer comparison).

The content distribution manager 720 may support data processing in accordance with examples as disclosed herein. For example, the content distribution manager 720 may be configured as or otherwise support a means for identifying, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels. The content distribution manager 720 may be configured as or otherwise support a means for modifying a feature associated with communication of the at least one content object for a test subset of the segment relative to a control subset of the segment. The content distribution manager 720 may be configured as or otherwise support a means for determining a first metric corresponding to the control subset and the test subset in association with the communication of the at least one content object via the first content communication channel and a second metric associated with the target tenant over a second content communication channel of the plurality of content communication channels. The content distribution manager 720 may be configured as or otherwise support a means for comparing the second metric to a metric associated with a peer group of tenants of the plurality of tenants. The content distribution manager 720 may be configured as or otherwise support a means for adjusting subsequent communications for the target tenant based at least in part on the comparing and the first metric.

Figure 8:
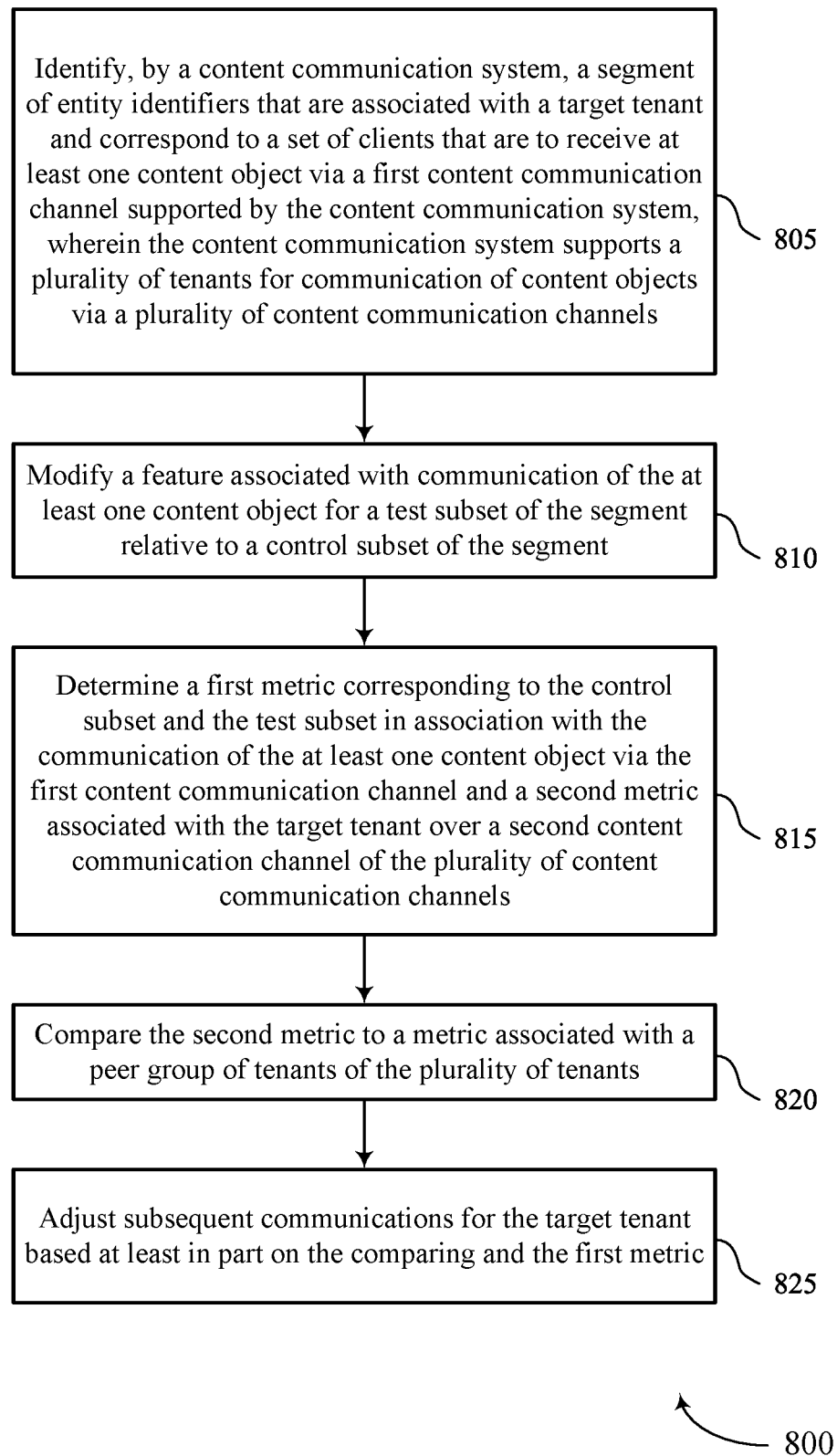
FIGS. 8 through 12 show flowcharts illustrating methods that support scalable multi-channel content distribution and optimization using peer comparison in accordance with aspects of the present disclosure.

FIG. 8 shows a flowchart illustrating a method 800 that supports scalable multi-channel content distribution and optimization using peer comparison in accordance with aspects of the present disclosure. The operations of the method 800 may be implemented by a server or its components as described herein. The server may be an example of an analytical data store, a communication server, or the like. For example, the operations of the method 800 may be performed by a server as described with reference to FIG. 1 through 7. In some examples, a server may execute a set of instructions to control the functional elements of the server to perform the described functions. Additionally or alternatively, the server may perform aspects of the described functions using special-purpose hardware.

At 805, the method may include identifying, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels. The operations of 805 may be performed in accordance with examples as disclosed herein. In some examples, aspects of the operations of 805 may be performed by a segment identification component 625 as described with reference to FIG. 6.

At 810, the method may include modifying a feature associated with communication of the at least one content object for a test subset of the segment relative to a control subset of the segment. The operations of 810 may be performed in accordance with examples as disclosed herein. In some examples, aspects of the operations of 810 may be performed by a feature modification component 630 as described with reference to FIG. 6.

At 815, the method may include determining a first metric corresponding to the control subset and the test subset in association with the communication of the at least one content object via the first content communication channel and a second metric associated with the target tenant over a second content communication channel of the plurality of content communication channels. The operations of 815 may be performed in accordance with examples as disclosed herein. In some examples, aspects of the operations of 815 may be performed by a metric component 635 as described with reference to FIG. 6.

At 820, the method may include comparing the second metric to a metric associated with a peer group of tenants of the plurality of tenants. The operations of 820 may be performed in accordance with examples as disclosed herein. In some examples, aspects of the operations of 820 may be performed by a metric comparison component 640 as described with reference to FIG. 6.

At 825, the method may include adjusting subsequent communications for the target tenant based at least in part on the comparing and the first metric. The operations of 825 may be performed in accordance with examples as disclosed herein. In some examples, aspects of the operations of 825 may be performed by a communication adjustment component 645 as described with reference to FIG. 6.

Figure 9:
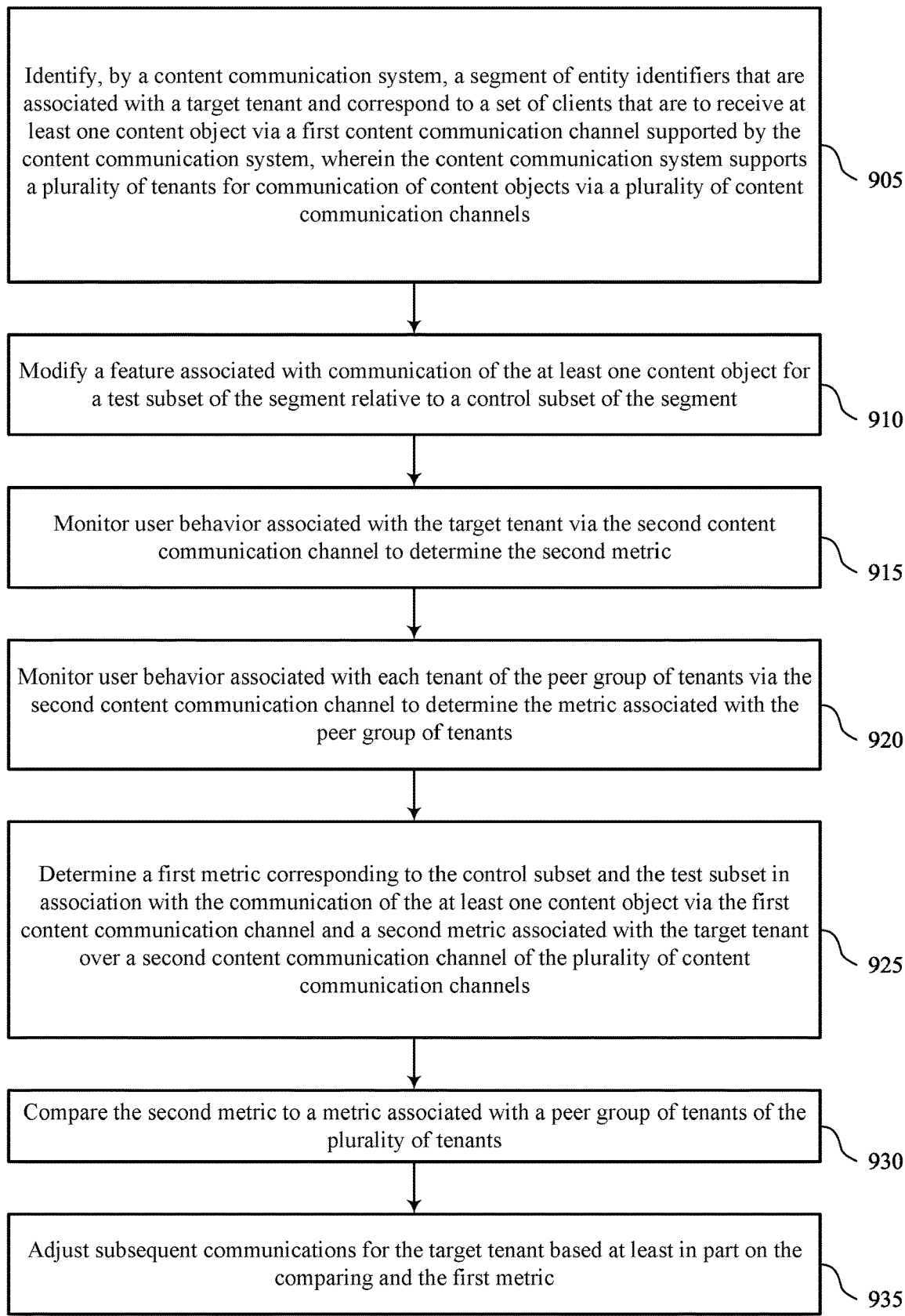

FIG. 9 shows a flowchart illustrating a method 900 that supports scalable multi-channel content distribution and optimization using peer comparison in accordance with aspects of the present disclosure. The operations of the method 900 may be implemented by a server or its components as described herein. The server may be an example of an analytical data store, a communication server, or the like. For example, the operations of the method 900 may be performed by a server as described with reference to FIG. 1 through 7. In some examples, a server may execute a set of instructions to control the functional elements of the server to perform the described functions. Additionally or alternatively, the server may perform aspects of the described functions using special-purpose hardware.

At 905, the method may include identifying, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels. The operations of 905 may be performed in accordance with examples as disclosed herein. In some examples, aspects of the operations of 905 may be performed by a segment identification component 625 as described with reference to FIG. 6.

At 910, the method may include modifying a feature associated with communication of the at least one content object for a test subset of the segment relative to a control subset of the segment. The operations of 910 may be performed in accordance with examples as disclosed herein. In some examples, aspects of the operations of 910 may be performed by a feature modification component 630 as described with reference to FIG. 6.

At 915, the method may include monitoring user behavior associated with the target tenant via the second content communication channel to determine the second metric. The operations of 915 may be performed in accordance with examples as disclosed herein. In some examples, aspects of the operations of 915 may be performed by a target user behavior data component 650 as described with reference to FIG. 6.

At 920, the method may include monitoring user behavior associated with each tenant of the peer group of tenants via the second content communication channel to determine the metric associated with the peer group of tenants. The operations of 920 may be performed in accordance with examples as disclosed herein. In some examples, aspects of the operations of 920 may be performed by a peer user behavior data component 655 as described with reference to FIG. 6.

At 925, the method may include determining a first metric corresponding to the control subset and the test subset in association with the communication of the at least one content object via the first content communication channel and a second metric associated with the target tenant over a second content communication channel of the plurality of content communication channels. The operations of 925 may be performed in accordance with examples as disclosed herein. In some examples, aspects of the operations of 925 may be performed by a metric component 635 as described with reference to FIG. 6.

At 930, the method may include comparing the second metric to a metric associated with a peer group of tenants of the plurality of tenants. The operations of 930 may be performed in accordance with examples as disclosed herein. In some examples, aspects of the operations of 930 may be performed by a metric comparison component 640 as described with reference to FIG. 6.

At 935, the method may include adjusting subsequent communications for the target tenant based at least in part on the comparing and the first metric. The operations of 935 may be performed in accordance with examples as disclosed herein. In some examples, aspects of the operations of 935 may be performed by a communication adjustment component 645 as described with reference to FIG. 6.

Figure 10:
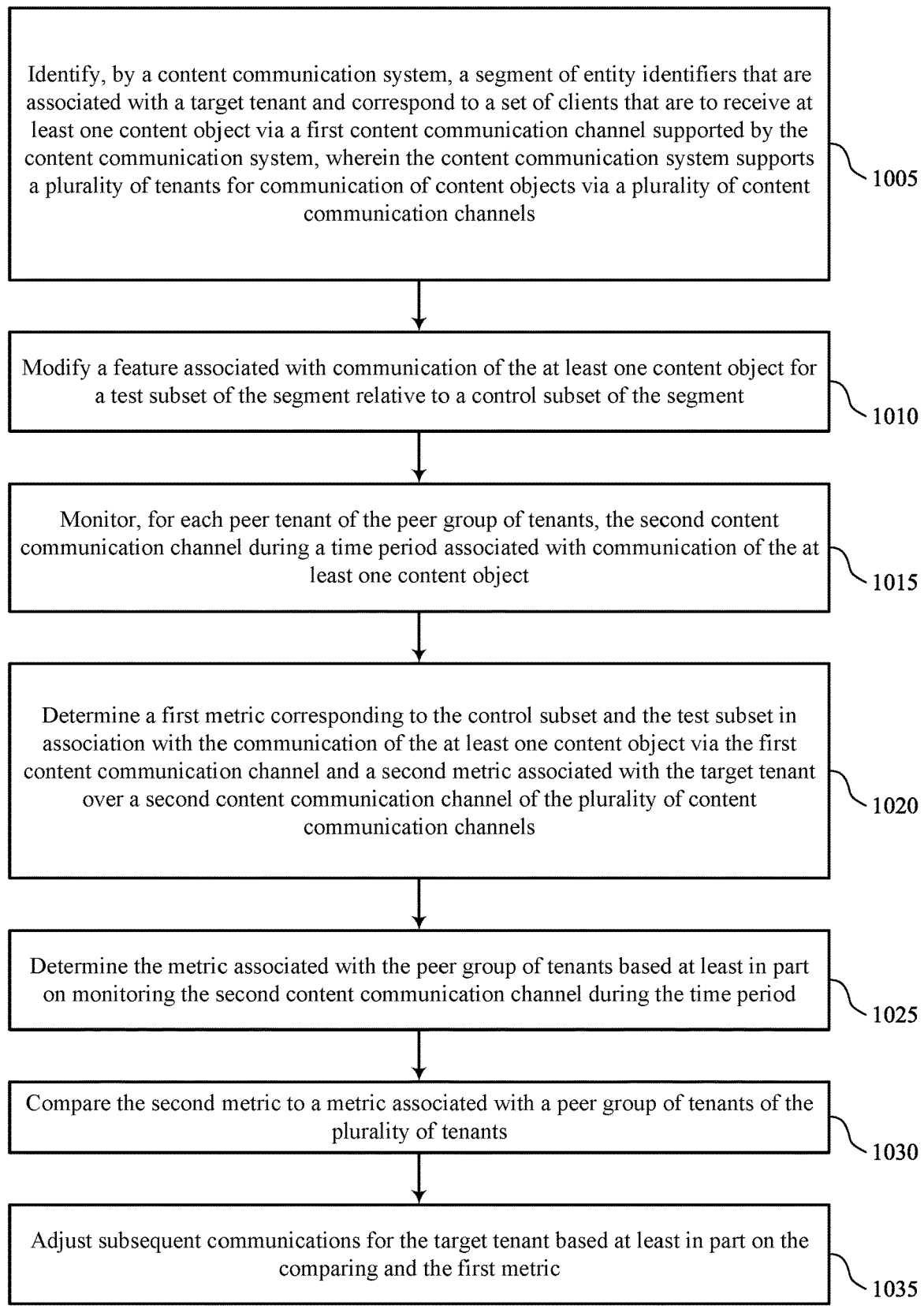

FIG. 10 shows a flowchart illustrating a method 1000 that supports scalable multi-channel content distribution and optimization using peer comparison in accordance with aspects of the present disclosure. The operations of the method 1000 may be implemented by a server or its components as described herein. For example, the operations of the method 1000 may be performed by a server as described with reference to FIG. 1 through 7. In some examples, a server may execute a set of instructions to control the functional elements of the server to perform the described functions. Additionally or alternatively, the server may perform aspects of the described functions using special-purpose hardware.

At 1005, the method may include identifying, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels. The operations of 1005 may be performed in accordance with examples as disclosed herein. In some examples, aspects of the operations of 1005 may be performed by a segment identification component 625 as described with reference to FIG. 6.

At 1010, the method may include modifying a feature associated with communication of the at least one content object for a test subset of the segment relative to a control subset of the segment. The operations of 1010 may be performed in accordance with examples as disclosed herein. In some examples, aspects of the operations of 1010 may be performed by a feature modification component 630 as described with reference to FIG. 6.

At 1015, the method may include monitoring, for each peer tenant of the peer group of tenants, the second content communication channel during a time period associated with communication of the at least one content object. The operations of 1015 may be performed in accordance with examples as disclosed herein. In some examples, aspects of the operations of 1015 may be performed by a peer user behavior data component 655 as described with reference to FIG. 6.

At 1020, the method may include determining a first metric corresponding to the control subset and the test subset in association with the communication of the at least one content object via the first content communication channel and a second metric associated with the target tenant over a second content communication channel of the plurality of content communication channels. The operations of 1020 may be performed in accordance with examples as disclosed herein. In some examples, aspects of the operations of 1020 may be performed by a metric component 635 as described with reference to FIG. 6.

At 1025, the method may include determining the metric associated with the peer group of tenants based at least in part on monitoring the second content communication channel during the time period. The operations of 1025 may be performed in accordance with examples as disclosed herein. In some examples, aspects of the operations of 1025 may be performed by a metric component 635 as described with reference to FIG. 6.

At 1030, the method may include comparing the second metric to a metric associated with a peer group of tenants of the plurality of tenants. The operations of 1030 may be performed in accordance with examples as disclosed herein. In some examples, aspects of the operations of 1030 may be performed by a metric comparison component 640 as described with reference to FIG. 6.

At 1035, the method may include adjusting subsequent communications for the target tenant based at least in part on the comparing and the first metric. The operations of 1035 may be performed in accordance with examples as disclosed herein. In some examples, aspects of the operations of 1035 may be performed by a communication adjustment component 645 as described with reference to FIG. 6.

Figure 11:
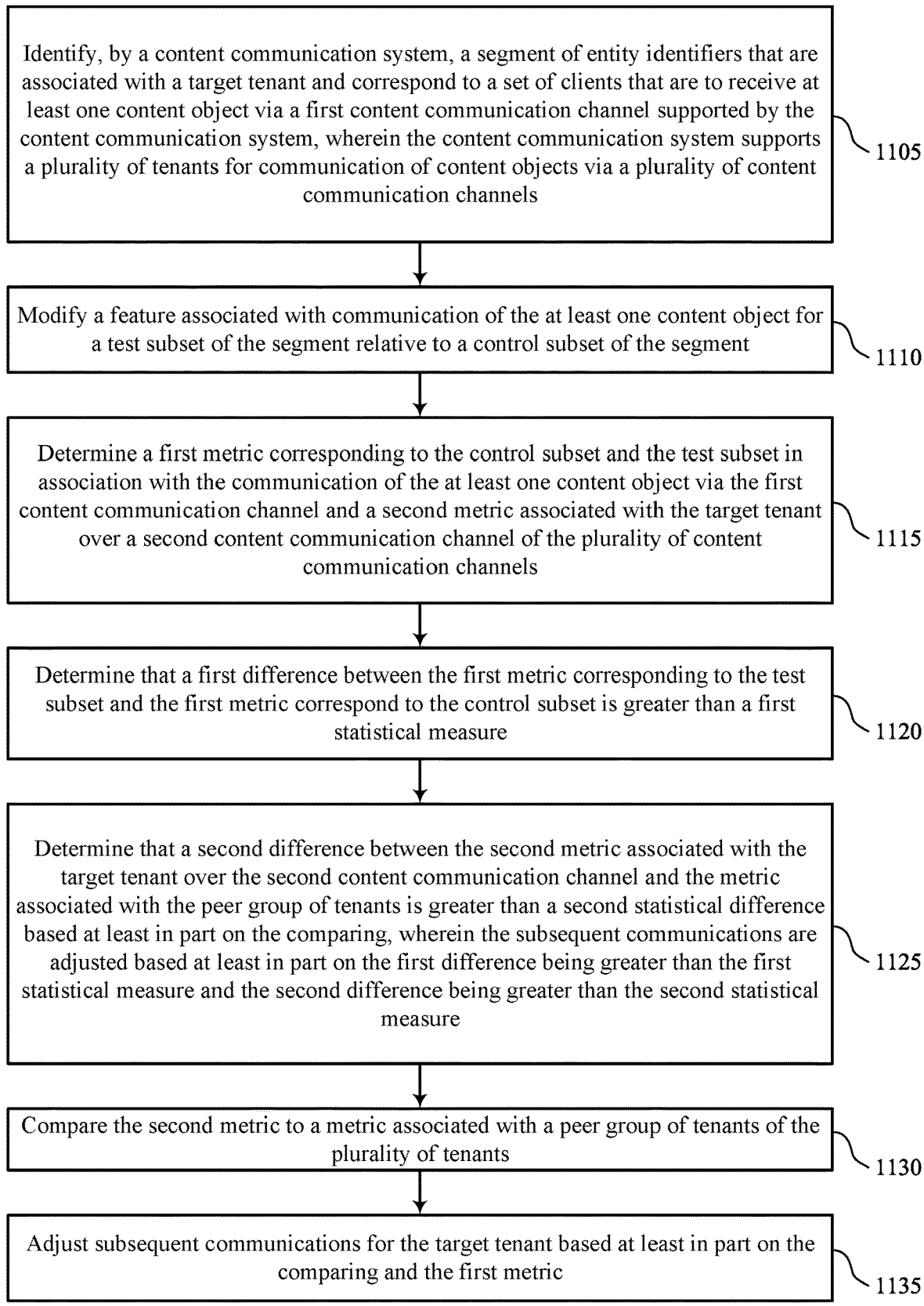

FIG. 11 shows a flowchart illustrating a method 1100 that supports scalable multi-channel content distribution and optimization using peer comparison in accordance with aspects of the present disclosure. The operations of the method 1100 may be implemented by a server or its components as described herein. For example, the operations of the method 1100 may be performed by a server as described with reference to FIG. 1 through 7. In some examples, a server may execute a set of instructions to control the functional elements of the server to perform the described functions. Additionally or alternatively, the server may perform aspects of the described functions using special-purpose hardware.

At 1105, the method may include identifying, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels. The operations of 1105 may be performed in accordance with examples as disclosed herein. In some examples, aspects of the operations of 1105 may be performed by a segment identification component 625 as described with reference to FIG. 6.

At 1110, the method may include modifying a feature associated with communication of the at least one content object for a test subset of the segment relative to a control subset of the segment. The operations of 1110 may be performed in accordance with examples as disclosed herein. In some examples, aspects of the operations of 1110 may be performed by a feature modification component 630 as described with reference to FIG. 6.

At 1115, the method may include determining a first metric corresponding to the control subset and the test subset in association with the communication of the at least one content object via the first content communication channel and a second metric associated with the target tenant over a second content communication channel of the plurality of content communication channels. The operations of 1115 may be performed in accordance with examples as disclosed herein. In some examples, aspects of the operations of 1115 may be performed by a metric component 635 as described with reference to FIG. 6.

At 1120, the method may include determining that a first difference between the first metric corresponding to the test subset and the first metric correspond to the control subset is greater than a first statistical measure. The operations of 1120 may be performed in accordance with examples as disclosed herein. In some examples, aspects of the operations of 1120 may be performed by a statistical measure component 660 as described with reference to FIG. 6.

At 1125, the method may include determining that a second difference between the second metric associated with the target tenant over the second content communication channel and the metric associated with the peer group of tenants is greater than a second statistical difference based at least in part on the comparing, wherein the subsequent communications are adjusted based at least in part on the first difference being greater than the first statistical measure and the second difference being greater than the second statistical measure. The operations of 1125 may be performed in accordance with examples as disclosed herein. In some examples, aspects of the operations of 1125 may be performed by a statistical measure component 660 as described with reference to FIG. 6.

At 1130, the method may include comparing the second metric to a metric associated with a peer group of tenants of the plurality of tenants. The operations of 1130 may be performed in accordance with examples as disclosed herein. In some examples, aspects of the operations of 1130 may be performed by a metric comparison component 640 as described with reference to FIG. 6.

At 1135, the method may include adjusting subsequent communications for the target tenant based at least in part on the comparing and the first metric. The operations of 1135 may be performed in accordance with examples as disclosed herein. In some examples, aspects of the operations of 1135 may be performed by a communication adjustment component 645 as described with reference to FIG. 6.

Figure 12:
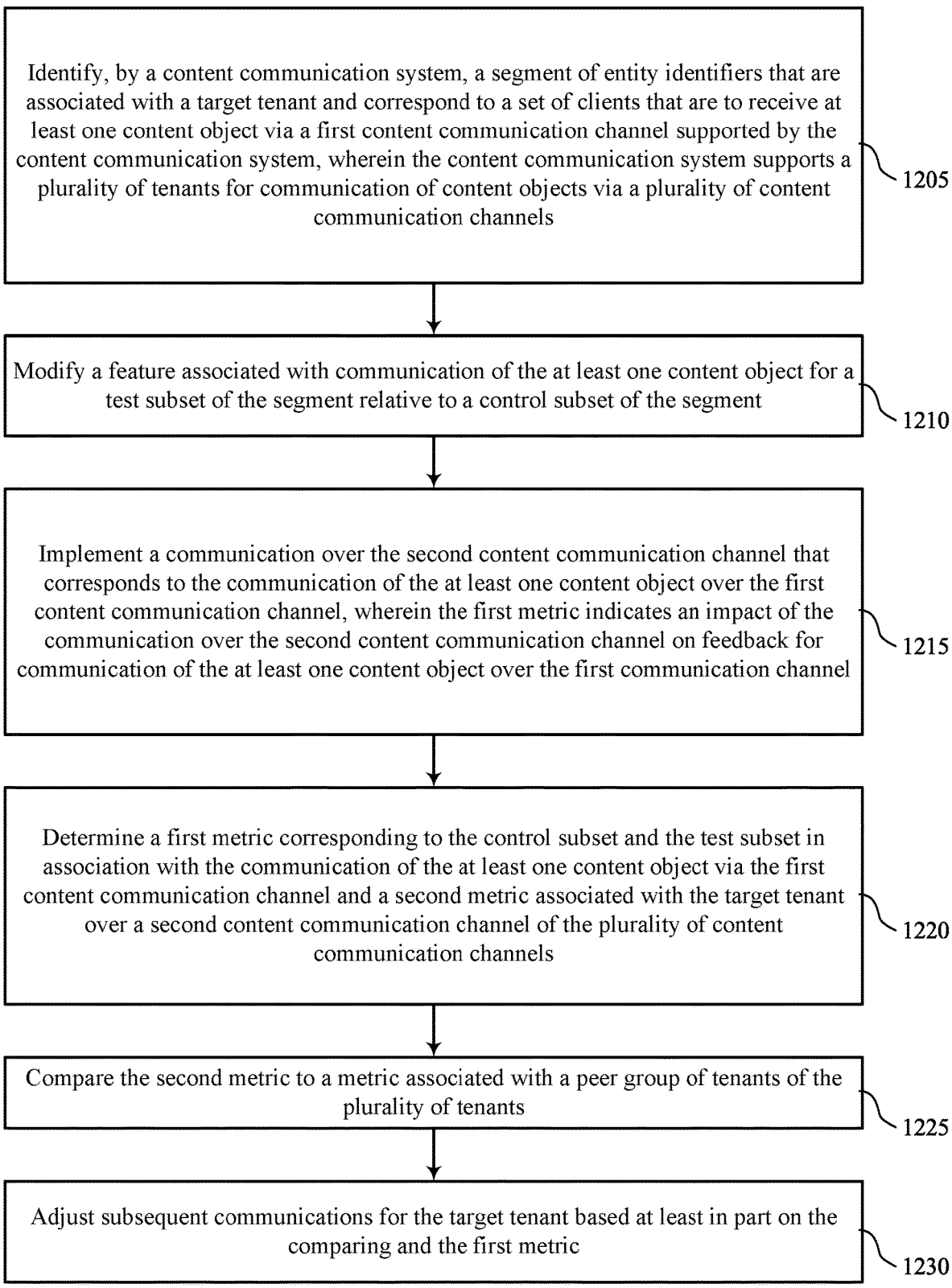

FIG. 12 shows a flowchart illustrating a method 1200 that supports scalable multi-channel content distribution and optimization using peer comparison in accordance with aspects of the present disclosure. The operations of the method 1200 may be implemented by a server or its components as described herein. For example, the operations of the method 1200 may be performed by a server as described with reference to FIG. 1 through 7. In some examples, a server may execute a set of instructions to control the functional elements of the server to perform the described functions. Additionally or alternatively, the server may perform aspects of the described functions using special-purpose hardware.

At 1205, the method may include identifying, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels. The operations of 1205 may be performed in accordance with examples as disclosed herein. In some examples, aspects of the operations of 1205 may be performed by a segment identification component 625 as described with reference to FIG. 6.

At 1210, the method may include modifying a feature associated with communication of the at least one content object for a test subset of the segment relative to a control subset of the segment. The operations of 1210 may be performed in accordance with examples as disclosed herein. In some examples, aspects of the operations of 1210 may be performed by a feature modification component 630 as described with reference to FIG. 6.

At 1215, the method may include implementing a communication over the second content communication channel that corresponds to the communication of the at least one content object over the first content communication channel, wherein the first metric indicates an impact of the communication over the second content communication channel on feedback for communication of the at least one content object over the first communication channel. The operations of 1215 may be performed in accordance with examples as disclosed herein. In some examples, aspects of the operations of 1215 may be performed by a communication adjustment component 645 as described with reference to FIG. 6.

At 1220, the method may include determining a first metric corresponding to the control subset and the test subset in association with the communication of the at least one content object via the first content communication channel and a second metric associated with the target tenant over a second content communication channel of the plurality of content communication channels. The operations of 1220 may be performed in accordance with examples as disclosed herein. In some examples, aspects of the operations of 1220 may be performed by a metric component 635 as described with reference to FIG. 6.

At 1225, the method may include comparing the second metric to a metric associated with a peer group of tenants of the plurality of tenants. The operations of 1225 may be performed in accordance with examples as disclosed herein. In some examples, aspects of the operations of 1225 may be performed by a metric comparison component 640 as described with reference to FIG. 6.

At 1230, the method may include adjusting subsequent communications for the target tenant based at least in part on the comparing and the first metric. The operations of 1230 may be performed in accordance with examples as disclosed herein. In some examples, aspects of the operations of 1230 may be performed by a communication adjustment component 645 as described with reference to FIG. 6.

A method for data processing is described. The method may include identifying, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels, modifying a feature associated with communication of the at least one content object for a test subset of the segment relative to a control subset of the segment, determining a first metric corresponding to the control subset and the test subset in association with the communication of the at least one content object via the first content communication channel and a second metric associated with the target tenant over a second content communication channel of the plurality of content communication channels, comparing the second metric to a metric associated with a peer group of tenants of the plurality of tenants, and adjusting subsequent communications for the target tenant based at least in part on the comparing and the first metric.

An apparatus for data processing is described. The apparatus may include a processor, memory in electronic communication with the processor, and instructions stored in the memory. The instructions may be executable by the processor to cause the apparatus to identify, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels, modify a feature associated with communication of the at least one content object for a test subset of the segment relative to a control subset of the segment, determine a first metric corresponding to the control subset and the test subset in association with the communication of the at least one content object via the first content communication channel and a second metric associated with the target tenant over a second content communication channel of the plurality of content communication channels, compare the second metric to a metric associated with a peer group of tenants of the plurality of tenants, and adjust subsequent communications for the target tenant based at least in part on the comparing and the first metric.

Another apparatus for data processing is described. The apparatus may include means for identifying, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels, means for modifying a feature associated with communication of the at least one content object for a test subset of the segment relative to a control subset of the segment, means for determining a first metric corresponding to the control subset and the test subset in association with the communication of the at least one content object via the first content communication channel and a second metric associated with the target tenant over a second content communication channel of the plurality of content communication channels, means for comparing the second metric to a metric associated with a peer group of tenants of the plurality of tenants, and means for adjusting subsequent communications for the target tenant based at least in part on the comparing and the first metric.

A non-transitory computer-readable medium storing code for data processing is described. The code may include instructions executable by a processor to identify, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels, modify a feature associated with communication of the at least one content object for a test subset of the segment relative to a control subset of the segment, determine a first metric corresponding to the control subset and the test subset in association with the communication of the at least one content object via the first content communication channel and a second metric associated with the target tenant over a second content communication channel of the plurality of content communication channels, compare the second metric to a metric associated with a peer group of tenants of the plurality of tenants, and adjust subsequent communications for the target tenant based at least in part on the comparing and the first metric.

Some examples of the method, apparatuses, and non-transitory computer-readable medium described herein may further include operations, features, means, or instructions for monitoring user behavior associated with the target tenant via the second content communication channel to determine the second metric and monitoring user behavior associated with each tenant of the peer group of tenants via the second content communication channel to determine the metric associated with the peer group of tenants.

In some examples of the method, apparatuses, and non-transitory computer-readable medium described herein, the second metric and the metric associated with the peer group of tenants correspond to a volume of posts, a volume of interaction, a positive semantic analysis, a negative semantic analysis, a volume of website purchases or a combination thereof.

Some examples of the method, apparatuses, and non-transitory computer-readable medium described herein may further include operations, features, means, or instructions for monitoring, for each peer tenant of the peer group of tenants, the second content communication channel during a time period associated with communication of the at least one content object and determining the metric associated with the peer group of tenants based at least in part on monitoring the second content communication channel during the time period.

Some examples of the method, apparatuses, and non-transitory computer-readable medium described herein may further include operations, features, means, or instructions for determining that a first difference between the first metric corresponding to the test subset and the first metric correspond to the control subset may be greater than a first statistical measure and determining that a second difference between the second metric associated with the target tenant over the second content communication channel and the metric associated with the peer group of tenants may be greater than a second statistical difference based at least in part on the comparing, wherein the subsequent communications may be adjusted based at least in part on the first difference being greater than the first statistical measure and the second difference being greater than the second statistical measure.

In some examples of the method, apparatuses, and non-transitory computer-readable medium described herein, determining the second metric may include operations, features, means, or instructions for implementing a Bayesian causal interference model to determine that the second metric may be associated with the modified feature.

Some examples of the method, apparatuses, and non-transitory computer-readable medium described herein may further include operations, features, means, or instructions for identifying the peer group of tenants based at least in part on a name associated with the target tenant, an industry associated with the target tenant, a company size associated with the target tenant, or a combination thereof.

Some examples of the method, apparatuses, and non-transitory computer-readable medium described herein may further include operations, features, means, or instructions for dividing the segment of entity identifiers into the test subset and the control subset based at least in part on geographical locations associated with one or more entity identifiers of the segment of entity identifiers.

In some examples of the method, apparatuses, and non-transitory computer-readable medium described herein, modifying the feature may include operations, features, means, or instructions for implementing a communication over the second content communication channel that corresponds to the communication of the at least one content object over the first content communication channel, wherein the first metric indicates an impact of the communication over the second content communication channel on feedback for communication of the at least one content object over the first communication channel.

In some examples of the method, apparatuses, and non-transitory computer-readable medium described herein, modifying the feature may include operations, features, means, or instructions for modifying a communication time, a communication schedule, a communication frequency, or a content payload.

In some examples of the method, apparatuses, and non-transitory computer-readable medium described herein, each content communication channel may be associated with a different platform type of a social media platform, an email platform, a search engine platform, or a video marketing platform.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   identifying, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels;
   modifying a feature associated with communication of the at least one content object for a test subset of the segment relative to a control subset of the segment;
   determining a first metric corresponding to the control subset and the test subset in association with the communication of the at least one content object via the first content communication channel;
   monitoring user behavior associated with the target tenant via a second content communication channel of the plurality of content communication channels to determine a second metric associated with the target tenant;
   monitoring user behavior associated with each tenant of a peer group of tenants via the second content communication channel to determine a metric associated with the peer group of tenants;
   comparing the second metric to the metric associated with the peer group of tenants; and
   adjusting subsequent communications for the target tenant based at least in part on the comparing and the first metric.

2. The method of claim 1, wherein the second metric and the metric associated with the peer group of tenants correspond to a volume of posts, a volume of interaction, a positive semantic analysis, a negative semantic analysis, a volume of website purchases, or a combination thereof.

3. The method of claim 1, wherein monitoring user behavior associated with the peer group of tenants comprises:
   monitoring, for each peer tenant of the peer group of tenants, the second content communication channel during a time period associated with communication of the at least one content object, wherein the metric associated with the peer group of tenants is determined based at least in part on the monitoring of the second content communication channel during the time period.

4. The method of claim 1, further comprising:
   determining that a first difference between the first metric corresponding to the test subset and the first metric correspond to the control subset is greater than a first statistical measure; and
   determining that a second difference between the second metric associated with the target tenant over the second content communication channel and the metric associated with the peer group of tenants is greater than a second statistical measure based at least in part on the comparing, wherein the subsequent communications are adjusted based at least in part on the first difference being greater than the first statistical measure and the second difference being greater than the second statistical measure.

5. The method of claim 1, wherein determining the second metric comprises:
   implementing a Bayesian causal interference model to determine that the second metric is associated with the modified feature.

6. The method of claim 1, further comprising:
   identifying the peer group of tenants based at least in part on a name associated with the target tenant, an industry associated with the target tenant, a company size associated with the target tenant, or a combination thereof.

7. The method of claim 1, further comprising:
   dividing the segment of entity identifiers into the test subset and the control subset based at least in part on geographical locations associated with one or more entity identifiers of the segment of entity identifiers.

8. The method of claim 1, wherein modifying the feature comprises:
   implementing a communication over the second content communication channel that corresponds to the communication of the at least one content object over the first content communication channel, wherein the first metric indicates an impact of the communication over the second content communication channel on feedback for communication of the at least one content object over the first communication channel.

9. The method of claim 1, wherein modifying the feature comprises:
   modifying a communication time, a communication schedule, a communication frequency, or a content payload.

10. The method of claim 1, wherein each content communication channel is associated with a different platform type of a social media platform, an email platform, a search engine platform, or a video marketing platform.

11. An apparatus for data processing, comprising:
a processor;
memory coupled with the processor; and
instructions stored in the memory and executable by the processor to cause the apparatus to:
identify, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels;
monitor user behavior associated with the target tenant via a second content communication channel of the plurality of content communication channels to determine a second metric associated with the target tenant;
monitor user behavior associated with each tenant of a peer group of tenants via the second content communication channel to determine a metric associated with the peer group of tenants;
compare the second metric to the metric associated with the peer group of tenants; and
adjust subsequent communications for the target tenant based at least in part on the comparing and the first metric.

12. The apparatus of claim 11, wherein the instructions to monitor user behavior associated with the peer group of tenants are further executable by the processor to cause the apparatus to:
monitor, for each peer tenant of the peer group of tenants, the second content communication channel during a time period associated with communication of the at least one content object, wherein the metric associated with the peer group of tenants is determined based at least in part on the monitoring of the second content communication channel during the time period.

13. The apparatus of claim 11, wherein the instructions are further executable by the processor to cause the apparatus to:
determine that a first difference between the first metric corresponding to the test subset and the first metric correspond to the control subset is greater than a first statistical measure; and
determine that a second difference between the second metric associated with the target tenant over the second content communication channel and the metric associated with the peer group of tenants is greater than a second statistical measure based at least in part on the comparing, wherein the subsequent communications are adjusted based at least in part on the first difference being greater than the first statistical measure and the second difference being greater than the second statistical measure.

14. The apparatus of claim 11, wherein the instructions to determine the second metric are executable by the processor to cause the apparatus to:
implement a Bayesian causal interference model to determine that the second metric is associated with the modified feature.

15. A non-transitory computer-readable medium storing code for data processing, the code comprising instructions executable by a processor to:
identify, by a content communication system, a segment of entity identifiers that are associated with a target tenant and correspond to a set of clients that are to receive at least one content object via a first content communication channel supported by the content communication system, wherein the content communication system supports a plurality of tenants for communication of content objects via a plurality of content communication channels;
modify a feature associated with communication of the at least one content object for a test subset of the segment relative to a control subset of the segment;
determine a first metric corresponding to the control subset and the test subset in association with the communication of the at least one content object via the first content communication channel;
monitor user behavior associated with the target tenant via a second content communication channel of the plurality of content communication channels to determine a second metric associated with the target tenant;
monitor user behavior associated with each tenant of a peer group of tenants via the second content communication channel to determine a metric associated with the peer group of tenants;
compare the second metric to the metric associated with the peer group of tenants; and
adjust subsequent communications for the target tenant based at least in part on the comparing and the first metric.

16. The non-transitory computer-readable medium of claim 15, wherein the instructions to monitor user behavior associated with the peer group of tenants are further executable by the processor to:
monitor, for each peer tenant of the peer group of tenants, the second content communication channel during a time period associated with communication of the at least one content object, wherein the metric associated with the peer group of tenants is determined based at least in part on the monitoring of the second content communication channel during the time period.

17. The non-transitory computer-readable medium of claim 15, wherein the instructions are further executable by the processor to:
determine that a first difference between the first metric corresponding to the test subset and the first metric correspond to the control subset is greater than a first statistical measure; and
determine that a second difference between the second metric associated with the target tenant over the second content communication channel and the metric associated with the peer group of tenants is greater than a second statistical measure based at least in part on the comparing, wherein the subsequent communications are adjusted based at least in part on the first difference being greater than the first statistical measure and the second difference being greater than the second statistical measure.

* * * * *